US012796604B2

(12) United States Patent
Deo et al.

(10) Patent No.: US 12,796,604 B2
(45) Date of Patent: Nov. 17, 2026

(54) UTILIZATION OF TELEMATIC AND REMOTE SENSING DATA TO GENERATE PREDICTIVE YIELD MAPS FOR OPERATION PLANNING AND CONTROL

(71) Applicant: Deere & Company, Moline, IL (US)

(72) Inventors: Mayur Deo, Warsaw, IN (US); Ajay Mishra, Pune (IN)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 19/213,728

(22) Filed: May 20, 2025

(65) Prior Publication Data

US 2026/0007095 A1 Jan. 8, 2026

Related U.S. Application Data

(60) Provisional application No. 63/668,494, filed on Jul. 8, 2024.

(51) Int. Cl.
*A01D 41/127* (2006.01)
*G05B 13/04* (2006.01)
(Continued)

(52) U.S. Cl.
CPC ......... *A01D 41/127* (2013.01); *G05B 13/048* (2013.01); *G05D 1/6484* (2024.01); *G05D 2105/15* (2024.01); *G05D 2107/21* (2024.01)

(58) Field of Classification Search
CPC .. A01D 41/127; G05B 13/048; G05D 1/6484; G05D 2105/15; G05D 2107/21
See application file for complete search history.

(56) References Cited

U.S. PATENT DOCUMENTS

| | | | | |
|---|---|---|---|---|
| 7,756,624 B2 * | 7/2010 | Diekhans | | A01B 69/007 701/423 |
| 10,909,368 B2 * | 2/2021 | Guo | | G06N 3/08 |

(Continued)

FOREIGN PATENT DOCUMENTS

| | | | | |
|---|---|---|---|---|
| CA | 3132175 A1 * | 5/2022 | | G05D 1/221 |
| CN | 118095792 B * | 9/2024 | | G06V 10/764 |

(Continued)

OTHER PUBLICATIONS

Kevin A. Hunt et al. Crop sequence boundaries using USDA National Agricultural Statistics Service historic cropland data layers. Statistical Journal of the IAOS (2024) vol. 40, pp. 237-246. [Online], [retrieved on Jun. 27, 2024]. Retrieved from the Internet <https://scholar.google.com/scholar?q=Statistical+Journal+of+the+IAOS+40+(2024)+237%E2%80%93246&hl=en&as_sdt=0&as_vis=1&oi=scholart>.

(Continued)

*Primary Examiner* — Babar Sarwar
(74) *Attorney, Agent, or Firm* — Christopher J. Volkmann; KELLY, HOLT & CHRISTENSON PLLC

(57) ABSTRACT

An agricultural system includes one or more processors and memory storing instructions, executable by the one or more processors. The instructions, when executed by the one or more processors, cause the one or more processors to perform steps comprising: obtaining historical yield data corresponding to one or more previous harvesting operations at a worksite; obtaining current yield data detected during a current harvesting operation at a worksite; obtaining worksite data indicative of one or more characteristics corresponding to the worksite; generating a predictive yield value corresponding to the worksite based on historical yield data, the current yield data, and the worksite data; generating an operation plan corresponding to an agricultural work (Continued)

machine based on the predictive yield value; and controlling the agricultural work machine based on the operation plan.

16 Claims, 12 Drawing Sheets

(51) Int. Cl.

| | |
|---|---|
| ***G05D 1/648*** | (2024.01) |
| ***G05D 105/15*** | (2024.01) |
| ***G05D 107/20*** | (2024.01) |

(56) References Cited

U.S. PATENT DOCUMENTS

| | | | | |
|---|---|---|---|---|
| 10,912,249 | B1 * | 2/2021 | Wilson | G05B 13/026 |
| 2007/0289207 | A1 * | 12/2007 | May | A01G 9/16 47/17 |
| 2012/0101861 | A1 * | 4/2012 | Lindores | A01B 79/005 705/7.11 |
| 2019/0107521 | A1 * | 4/2019 | Riley | G01K 3/14 |
| 2019/0108631 | A1 * | 4/2019 | Riley | G06T 7/0004 |
| 2020/0323133 | A1 * | 10/2020 | Anderson | A01D 41/127 |
| 2020/0323134 | A1 * | 10/2020 | Darr | A01B 79/005 |
| 2020/0326674 | A1 * | 10/2020 | Palla | A01D 41/141 |
| 2020/0326727 | A1 * | 10/2020 | Palla | A01B 69/004 |
| 2020/0378088 | A1 * | 12/2020 | Anderson | A01B 69/008 |
| 2021/0015041 | A1 * | 1/2021 | Bormann | A01B 69/004 |
| 2021/0129853 | A1 * | 5/2021 | Appleton | G06Q 10/047 |
| 2021/0176916 | A1 * | 6/2021 | Sidon | A01B 79/005 |
| 2021/0176918 | A1 * | 6/2021 | Franzen | A01B 79/005 |
| 2021/0289687 | A1 * | 9/2021 | Heinold | A01C 21/005 |
| 2021/0321566 | A1 * | 10/2021 | Darr | A01B 79/005 |
| 2021/0321567 | A1 * | 10/2021 | Sidon | A01B 76/00 |

FOREIGN PATENT DOCUMENTS

| | | | | |
|---|---|---|---|---|
| DE | 102022117927 | A1 * | 1/2024 | G06Q 10/04 |
| EP | 3643159 | A1 * | 4/2020 | A01D 41/127 |
| EP | 3819837 | A1 * | 5/2021 | G06Q 50/02 |

OTHER PUBLICATIONS

Kevin A. Hunt et al. Maximizing ArcGIS Pro for The Crop Sequence Boundaries (CSB) Project. Optimize Crop Zoning and Land Planning Boundaries Presentation 2023 [online], [retrieved on May 20, 2025], Retrieved from the Internet <https://data.nass.usda.gov/Education_and_Outreach/Reports,_Presentations_and_Conferences/reports/conferences/ESRI-2023/Maximizing%20ArcGIS%20Pro%20for%20The%20Crop%20Sequence%20Boundaries%20(CSB)%20Project.pdf>.

* cited by examiner

UTILIZATION OF TELEMATIC AND REMOTE SENSING DATA TO GENERATE PREDICTIVE YIELD MAPS FOR OPERATION PLANNING AND CONTROL

CROSS-REFERENCE TO RELATED APPLICATION

The present application is based on and claims the benefit of U.S. Provisional Patent Application Ser. No. 63/668,494 filed, Jul. 8, 2024, the content of which is hereby incorporated by reference in its entirety.

FIELD OF THE DESCRIPTION

The present description relates to worksite operations. More specifically, the present description relates to controlling worksite operations, such as agricultural operations at agricultural worksites.

BACKGROUND

There are a wide variety of different types of agricultural operations. One such agricultural operation is a harvesting operation. Agricultural systems can include a plurality of mobile agricultural work machines (e.g., harvester(s), material receiving machine(s), etc.) that operate at an agricultural worksite to perform a harvesting operation. The plurality of mobile agricultural work machines can be controlled to coordinate the performance of and execute the harvesting operation. The harvesting operation can be planned and the plurality of mobile agricultural work machines can be controlled based on characteristics corresponding to the agricultural worksite.

The discussion above is merely provided for general background information and is not intended to be used as an aid in determining the scope of the claimed subject matter.

SUMMARY

An agricultural system includes one or more processors and memory storing instructions, executable by the one or more processors. The instructions, when executed by the one or more processors, cause the one or more processors to perform steps comprising: obtaining historical yield data corresponding to one or more previous harvesting operations at a worksite; obtaining current yield data detected during a current harvesting operation at a worksite; obtaining worksite data indicative of one or more characteristics corresponding to the worksite; generating a predictive yield value corresponding to the worksite based on historical yield data, the current yield data, and the worksite data; generating an operation plan corresponding to an agricultural work machine based on the predictive yield value; and controlling the agricultural work machine based on the operation plan.

A computer implemented method includes: obtaining historical yield data corresponding to one or more previous harvesting operations at a worksite; obtaining current yield data detected during a current harvesting operation at a worksite; obtaining worksite data indicative of one or more characteristics corresponding to the worksite; generating a predictive yield value corresponding to the worksite based on historical yield data, the current yield data, and the worksite data; generating an operation plan corresponding to an agricultural work machine based on the predictive yield value; and controlling the agricultural work machine based on the operation plan.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
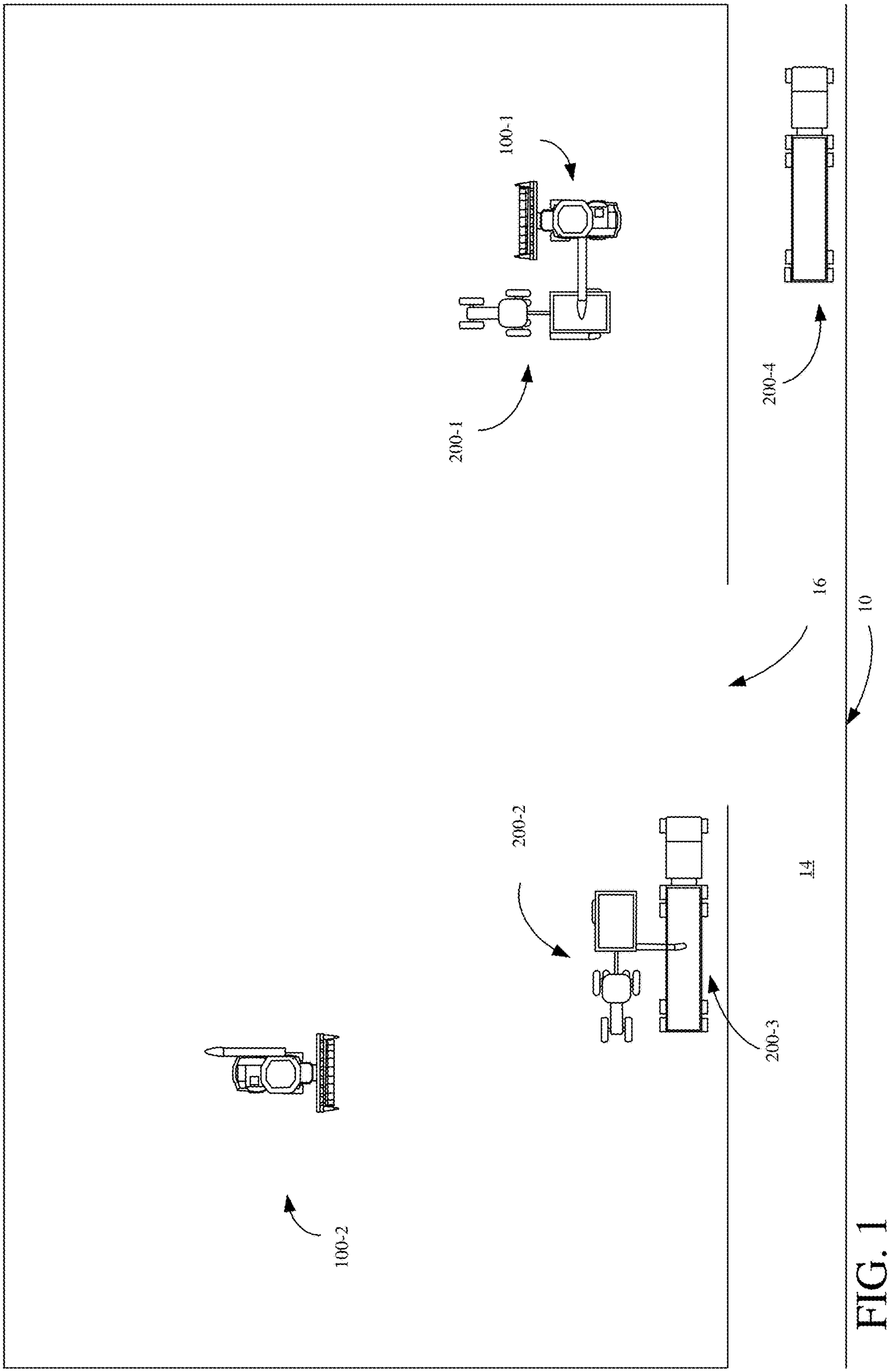
FIG. 1 is a pictorial illustration showing an example agricultural harvesting operation at an example agricultural worksite.

For the purpose of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

During a harvesting operation, one or more mobile agricultural harvesting machines harvest crop at an agricultural worksite, which can include one or more fields. One or more mobile material receiving machines, such as mobile grain carts (e.g., towed grain carts) and mobile grain trailers (e.g., towed grain trailers), coordinate to receive harvested material harvested by the mobile agricultural harvesting machines and to transport the harvested material from the one or more fields to a delivery location (e.g., dryer, storage location, purchasing facility, such as a grain mill, etc.).

Planning of the harvesting operation and control of one or more agricultural work machines can be based on characteristics corresponding to the agricultural worksite. One example of such a characteristic is yield (crop yield). Yield values (e.g., bushels, etc.), can be used to control settings (e.g., settings of controllable subsystems) of each of the one or more agricultural work machines, to determine machine routes, to determine the amount of crop (e.g., number of bushels) remaining at a worksite to be harvested, to determine machine assignments (e.g., establish the numbers and types of agricultural work machines to assign to the worksite and the locations at which to deploy the agricultural work machines), to determine delivery locations (e.g., locations to which crop is to be delivered), to determine the crop capacities required (e.g., storage capacity, dryer capacity, machine crop capacity, etc.), as well as be used in a variety of other ways.

Accurate predictive yield of a worksite would help operators and users to improve performance of an agricultural harvesting operation, such as by reducing grain loss, reducing downtime, as well as reducing other inefficiencies.

The present description proceeds with respect to example systems and methods for predictive yield (yield values) of a worksite and control of one or more agricultural work machines based thereon.

Figure 2:
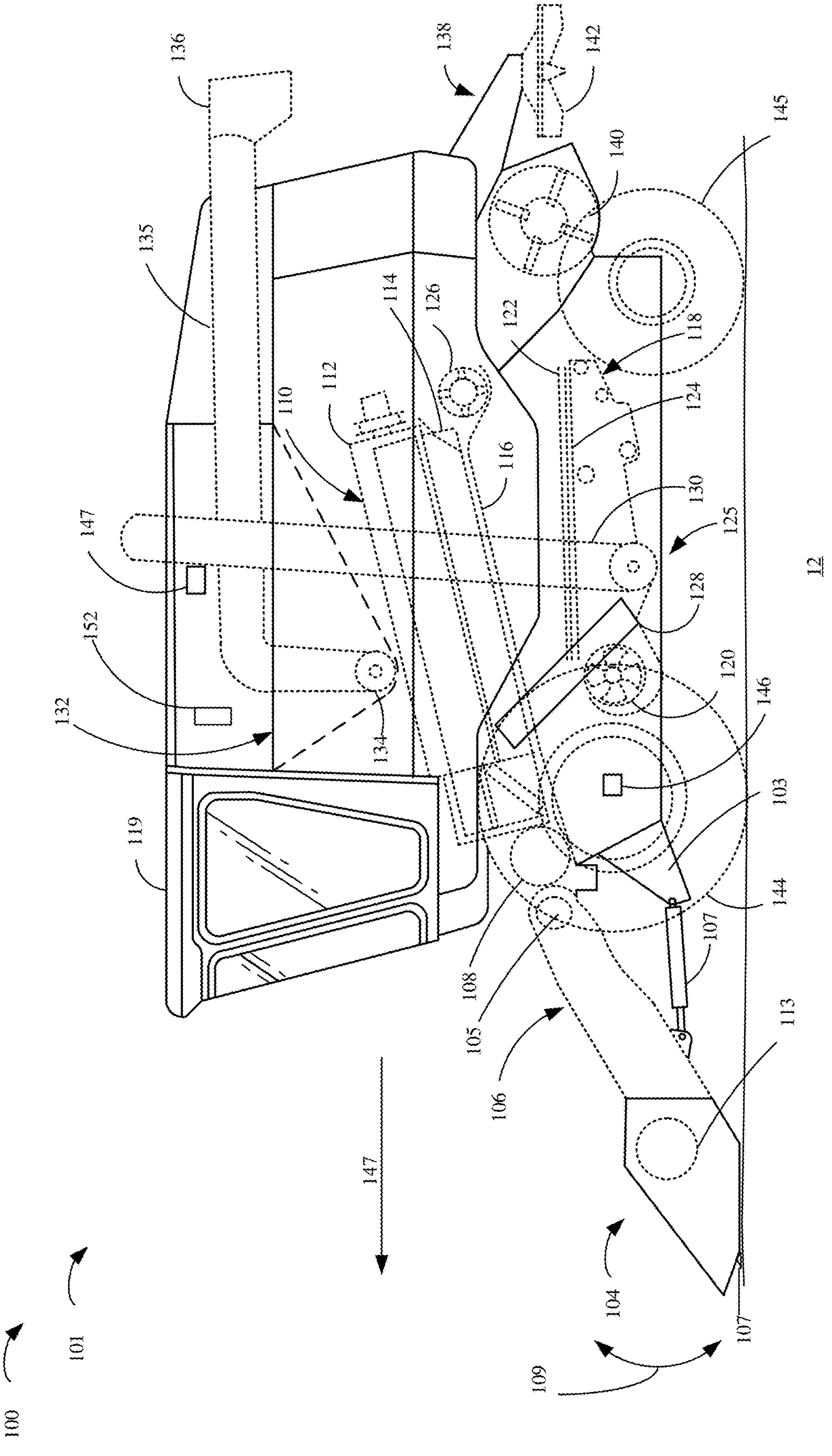
FIG. 2 is a partial pictorial, partial schematic illustration showing an example agricultural harvester.

FIG. 1 is a pictorial illustration showing an example agricultural worksite operation. FIG. 1 illustrates an example harvesting operation in which a plurality mobile agricultural work machines carry out a harvesting at an example worksite 10. Worksite 10 includes field 12. Field 12 includes a field entrance/exit 16 useable by the mobile agricultural work machines to enter and exit field 12. The mobile agricultural work machines shown in FIG. 1 include a plurality of mobile 11 harvesting machines 100 (illustratively 100-1 and 100-2) and a plurality of mobile material receiving machines 200 (illustratively shown as 200-1, 200-2, 200-3, and 200-4). In the example shown in FIG. 1, mobile harvesting machines 100 (also referred to herein as harvesters 100) are combine harvesters (one example of which is shown in FIG. 2). In the example shown in FIG. 1, mobile material receiving machines 200 (also referred to herein as receiving machines 200) include mobile grain carts (illustratively 200-1 and 200-2) and mobile grain trailers (illustratively 200-3 and 200-4). As can be seen, in the example shown in FIG. 1, receiving machines 200 include a towing vehicle (e.g., a tractor in the example of mobile grain carts and truck in the example of mobile grain trailers) and a towed material receptacle (e.g., cart, trailer).

As can be seen in FIG. 1, harvesters 100 travel the field and harvest crop. A mobile grain cart 200-1 is shown traveling in tandem with harvester 100-1 and receiving harvested material from the harvester 100-1. A mobile grain trailer 200-2 is shown parked at an unload location. A mobile grain cart 200-2 is shown located relative to the unload location (and thus the mobile grain trailer 200-3) to unload material (collected from a harvester, such as harvester 100-2) into mobile grain trailer 200-3. Additionally, as shown in FIG. 1, a mobile grain trailer 200-4 is shown traveling away from field 12 on road 14. The mobile grain trailer 200-4, having been previously parked at the unload location (or another unload location) and filled (at least to a threshold level) by one or both of mobile grain carts 200-1 and 200-2 leaves the field 12 and travels road 14 to a delivery location (e.g., dryer, storage bin, grain mill, etc.).

FIG. 2 is partial pictorial, partial schematic illustration of an example agricultural harvester 100. In the example shown in FIG. 2, agricultural harvester 100 is in the form of a combine harvester 101. As illustrated in FIG. 2, combine harvester 101 includes ground engaging traction elements (wheels or tracks) 144 and 145 which can be driven by a propulsion subsystem (e.g., motor or engine and other drivetrain elements, such as a gear box, hydrostatic drive, etc.) to propel combine harvester 101 across a worksite. Combine harvester 101 includes an operator compartment or cab 119, which can include a variety of different operator interface mechanisms (e.g., 418 shown in FIG. 3) for controlling combine harvester 101 as well as for presenting (e.g., displaying, etc.) various information. Combine harvester 101 includes a feeder house 106, a feed accelerator 108, and a thresher generally indicated at 110. The feeder house 106 and the feed accelerator 108 form part of a material handling subsystem 125. Header 104 is pivotally coupled to frame 103 of combine harvester 101 along pivot axis 105. One or more actuators 107 drive movement of header 104 about axis 105 in the direction generally indicated by arrow 109. Thus, a vertical position of header 104 (the header height) above ground 111 over which the header 104 travels is controllable by actuating actuator 107. While not shown in FIG. 1, combine harvester 101 may also include one or more actuators that operate to apply a tilt angle, a roll angle, or both to the header 104 or portions of header 104.

Combine harvester 101 includes a material handling subsystem 125 that includes a thresher 110 which illustratively includes a threshing rotor 112 and a set of concaves 114. Further, material handling subsystem 125 also includes a separator 116. Agricultural harvester 101 also includes a cleaning subsystem or cleaning shoe (collectively referred to as cleaning subsystem 118) that includes a cleaning fan 120, chaffer 122, and sieve 124. The material handling subsystem 125 also includes discharge beater 126, tailings elevator 128, and clean grain elevator 130. The clean grain elevator moves clean grain into a material receptacle (or clean grain tank) 132.

Combine harvester 101 also includes a material transfer subsystem that includes a conveying mechanism 134 and a chute 135. Chute 135 includes a spout 136. In some examples, spout 136 can be movably coupled to chute 135 such that spout 136 can be controllably rotated to change the orientation of spout 136. Conveying mechanism 134 can be a variety of different types of conveying mechanisms, such as an auger or blower. Conveying mechanism 134 is in communication with clean grain tank 132 and is driven (e.g., by an actuator, such as motor or engine) to convey material from grain tank 132 through chute 135 and spout 136. Chute 135 is rotatable through a range of positions from a storage position (shown in FIG. 2) to a variety of deployed positions away from combine harvester 101 to align spout 136 relative to a material receptacle of a material receiving machine 200. One example of such a deployed position is shown in FIG. 1 (e.g., as shown in the in-tandem unloading operation between harvester 100-1 and receiving machine 200-1). Spout 136, in some examples, is also rotatable, by an actuator, to adjust the direction of the material stream exiting spout 136.

Combine harvester 101 also includes a residue subsystem 138 that can include chopper 140 and spreader 142. In some examples, a harvester within the scope of the present disclosure may have more than one of any of the subsystems mentioned above. In some examples, a harvester may have left and right cleaning subsystems, separators, etc., which are not shown in FIG. 2.

In operation, and by way of overview, combine harvester 101 illustratively moves through a field 12 in the direction indicated by arrow 147. As harvester 100 moves, header 104 engages the crop plants to be harvested and cuts (with a cutter bar 107 on the header 104) the crop plants to generate cut crop material.

The cut (or severed) crop material is engaged by a cross auger 113 which conveys the severed crop material to a center of the header 104 where the severed crop material is then moved through an opening to a conveyor in feeder house 106 toward feed accelerator 108, which accelerates the severed crop material into thresher 110. The severed crop material is threshed by rotor 112 rotating the crop against concaves 114. The threshed crop material is moved by a separator rotor in separator 116 where a portion of the residue is moved by discharge beater 126 toward the residue subsystem 138. The portion of residue transferred to the residue subsystem 138 is chopped by residue chopper 140 and spread on the field by spreader 142. In other configurations, the residue is released from the agricultural harvester 101 in a windrow.

Grain falls to cleaning subsystem 118. Chaffer 122 separates some larger pieces of material other than grain (MOG) from the grain, and sieve 124 separates some of finer pieces of MOG from the grain. The grain then falls to an auger that moves the grain to an inlet end of grain elevator 130, and the grain elevator 130 moves the grain upwards, depositing the grain in grain tank 132. Residue is removed from the cleaning subsystem 118 by airflow generated by one or more cleaning fans 120. Cleaning fans 120 direct air along an airflow path upwardly through the sieves and chaffers. The airflow carries residue rearwardly in combine harvester 101 toward the residue handling subsystem 138.

Tailings elevator 128 returns tailings to thresher 110 where the tailings are re-threshed. Alternatively, the tailings also may be passed to a separate re-threshing mechanism by a tailings elevator or another transport device where the tailings are re-threshed as well.

Combine harvester 101 can include a variety of sensors, some of which are illustrated in FIG. 1, such one or more ground speed sensor s146, one or more mass flow sensors 147, and one or more fill level sensors 152.

Ground speed sensors 146 sense the travel speed of combine harvester 101 over the ground. Ground speed sensors 146 may sense the travel speed of the combine harvester 101 by sensing the speed of rotation of the ground engaging traction elements 144 or 145, or both, a drive shaft, an axle, or other components. In some instances, the travel speed may be sensed using a positioning system, such as a global positioning system (GPS), a dead reckoning system, a long-range navigation (LORAN) system, a Doppler speed sensor, or a wide variety of other systems or sensors that provide an indication of travel speed. Ground speed sensors 146 can also include direction sensors such as a compass, a magnetometer, a gravimetric sensor, a gyroscope, GPS derivation, to determine the direction of travel in two or three dimensions in combination with the speed. This way, when combine harvester 101 is on a slope, the orientation of harvester 101 relative to the slope is known. For example, an orientation of combine harvester 101 could include ascending, descending or transversely travelling the slope.

Mass flow sensors 147 sense the mass flow of material (e.g., grain) through clean grain elevator 130. Mass flow sensors 147 may be disposed at various locations, such as within or at the outlet of clean grain elevator 130. In some examples, the mass flow rate of material sensed by mass flow sensors 147 is used in the calculation of yield as well as in the calculation of the fill level of the on-board material tank 132. In some examples, mass flow sensors 147 include an impact (or strike) plate that is impacted by material (e.g., grain) conveyed by clean grain elevator 130 and a force or load sensor that detects the force or load of impact of the material on the impact (or strike) plate. This is merely one example of a mass flow sensor.

Fill level sensors 152 can include one or more of a variety of sensors. In some examples, fill level sensors 152 detect a fill level of grain in grain tank 132. Fill level sensors 152 can include paddles (or other contact members) that are contacted by the grain and the displacement of the contact members or force or load of impact of the material on the contact member can be detected to determine presence of grain material at the level of the tank corresponding to the sensor. In some examples, fill level sensors can include weight or load sensors disposed in the grain tank 132 or between components of the combine harvester 101 (e.g., between grain tank 132 and a frame of the combine harvester, etc.) to detect a weight of the grain in grain tank 132 which can be used to detect to a fill level. In some examples, fill level sensors 152 can configured to capture electromagnetic radiation to detect presence and fill level of grain in the grain tank. In some examples, fill level sensors 152 are used to alert an operator when the combine harvester 101 is full (or is approaching full). These are merely some examples. While FIG. 1 shows some example positions of fill level sensors 152, it will be understood that fill level sensors 152 can, additionally or alternatively, be positioned (or otherwise disposed) at a variety of other locations on combine harvester 101. Additionally, it will be understood that the sensor data generated by fill level sensors 152 can be used in the calculation of yield.

Combine harvester 101 can include various other sensors.

Figure 3:
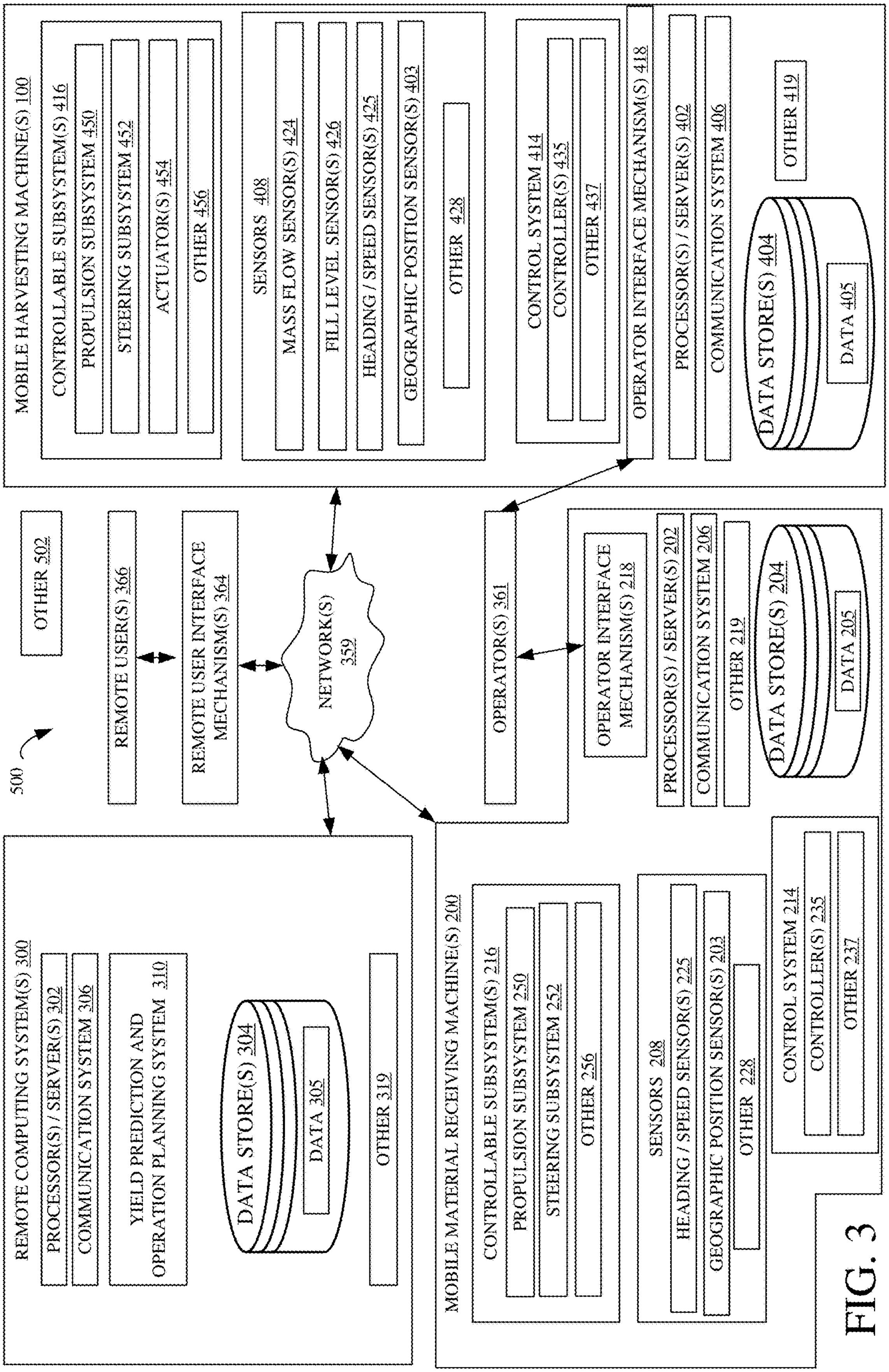
FIG. 3 is a block diagram of one example agricultural system architecture.

FIG. 3 is a block diagram showing one example agricultural system architecture 500 (also referred to herein as agricultural system 500 or system 500). Agricultural system 500 includes one or more harvesters 100 (such as one or more combines 101 or other types of harvesters) and one or more receiving machines 200 (such as one or more mobile grain carts and one or more mobile grain trailers). Agricultural system 500 also includes one or more remote computing systems 300, one or more networks 359, one or more remote user interface mechanisms 364, and can include a variety of other items 502 as well.

Each harvester 100, itself, illustratively includes one or more processors or servers 402, one or more data stores 404, communication system 406, one or more sensors 408, control system 414, one or more controllable subsystems 416, one or more operator interface mechanisms 418, and can include various other items and functionality 419 as well.

Each receiving machine 200, itself, illustratively includes one or more processors or servers 202, one or more data stores 204, communication system 206, one or more sensors 208, control system 214, one or more controllable subsystems 216, one or more operator interface mechanisms 218, and can include various other items and functionality 219 as well.

Remote computing systems 300, as illustrated, include one or more processors or servers 302, one or more data stores 304, communication system 306, yield prediction and operation planning system 310, and can include various other items and functionality 319.

Data stores 204, data stores 304, or data stores 404, or a combination thereof, store a variety of data (generally indicated as data 205, data 305, and data 405 respectively), some of which will be described in more detail herein. For example, data 205, data 305, or data 405, or a combination thereof, can include, among other things, historical yield data, current yield data, worksite data, as well as various other data. Some examples of the various data will be described in more detail in FIG. 4. Additionally, data 205 can include computer executable instructions that are executable by one or more processors or servers 202 to implement other items or functionalities of system 500 (e.g., other items or functionalities of receiving machines 200, etc.). Additionally, data 305 can include computer executable instructions that are executable by one or more processors or servers 302 to implement other items or functionalities of system 500 (e.g., other items or functionalities of remote computing systems 300, etc.). Additionally, data 405 can include computer executable instructions that are executable by one or more processors or servers 402 to implement other items or functionalities of system 500 (e.g., other items or functionalities of harvesters 100, etc.). It will be understood that data stores 204, data stores 304, or data stores 404, or all three, can include different forms of data stores, for instance both volatile data stores (e.g., Random Access Memory (RAM)) and non-volatile data stores (e.g., Read Only Memory (ROM), hard drives, solid state drives, etc.).

Sensors 408 can include one or more mass flow sensors 424, one or more fill level sensors 426, one or more heading/speed sensors 425, geographic position sensors 403, and can include various other sensors 428 as well. The sensor data generated by sensors 408 can be communicated to remote computing systems 300, to receiving machines 200, to other harvesters 100, and to other items of a corresponding harvester 100. Control system 414, itself, can include one or more controllers 435 for controlling various other items of harvester 100, and can include other items 437 as well. Controllable subsystems 416 can include propulsion subsystem 450, steering subsystem 452, actuators 454, and can include various other subsystems 456 as well.

Sensors 208 can include one or more heading/speed sensors 225, one or more geographic position sensors 203, and can include various other sensors 228 as well. The sensor data generated by sensors 208 can be communicated to remote computing systems 300, to harvesters 100, and to other items of a corresponding receiving machine 200. Control system 214, itself, can include one or more controllers 235 for controlling various other items of material receiving machine 200, and can include other items 237 as well. Controllable subsystems 216 can include propulsion subsystem 250, steering subsystem 252, and can include various other subsystems 256 as well.

Mass flow sensors 424 detect a mass flow of material (e.g., grain) into a material receptacle (e.g., grain tank 132) of a harvester 100. The mass flow sensors 424 can comprise one or more impact sensors, positioned in the clean grain elevator 130, that are impacted by material (grain) as the material is flowing into the grain tank 132. In other examples, the mass flow sensors 424 can be other types of flow sensing devices such as non-contact sensors, for instance, electromagnetic (EM) radiation sensing devices that generate EM radiation that is directed through the material flow and receive the EM radiation that flows through or is reflected from the material flow. In one example, mass flow sensors 424 are (or are similar to) mass flow sensors 147. These are merely some examples.

Fill level sensors 426 detect a fill level of material (e.g., grain) in a material receptacle (e.g., grain tank 132) of a harvester 100. The fill level sensors 426 can comprise contact sensors having a contact member configured to be contacted by the grain in the grain tank 132 and the displacement of the contact member or force or load of impact of the material on the contact member can be detected to determine presence of grain material at the level of the tank corresponding to the sensor. Fil level sensors 426 can comprise weight or load sensors configured to detect a weight of grain in the grain tank 132. Fill level sensors 426 can comprise non-contact sensors configured to capture electromagnetic radiation to detect presence and fill level of grain in the grain tank 132. In one example, fill level sensors 426 are (or are similar to) fill level sensors 152. These are merely some examples.

Heading/speed sensors 425 detect a heading characteristic (e.g., travel direction) or speed characteristic (e.g., travel speed, acceleration, deceleration, etc.), or both, of a harvester 100. Heading/speed sensors 225 detect a heading characteristic (e.g., travel direction) or speed characteristic (e.g., travel speed, acceleration, deceleration, etc.), or both, of a receiving machine 200. This can include sensors that sense the movement (e.g., rotation) of ground-engaging elements (e.g., wheels or tracks) or movement of components coupled to the ground engaging elements (e.g., axles) or other elements, or can utilize signals received from other sources, such as geographic position sensors. Thus, while heading/speed sensors 425 as described herein are shown as separate from geographic position sensors 403, in some examples, machine heading/speed is derived from signals received from geographic position sensors 403 and subsequent processing. In other examples, heading/speed sensors 425 are separate sensors and do not utilize signals received from other sources. In one example, heading/speed sensors 425 are (or are similar to) sensors 146. Similarly, while heading/speed sensors 225 as described herein are shown as separate from geographic position sensors 203, in some examples, machine heading/speed is derived from signals received from geographic position sensors 203 and subsequent processing. In other examples, heading/speed sensors 225 are separate sensors and do not utilize signals received from other sources.

Geographic position sensors 403 illustratively sense or detect the geographic position or location of a harvester 100. Geographic position sensors 203 illustratively sense or detect the geographic position or location of a material receiving machine 200. Geographic position sensors 403 and 203 can include, but are not limited to, a global navigation satellite system (GNSS) receiver that receives signals from a GNSS satellite transmitter. Geographic position sensors 403 and 203 can also include a real-time kinematic (RTK) component that is configured to enhance the precision of position data derived from the GNSS signal. Geographic position sensors 403 and 203 can include a dead reckoning system, a cellular triangulation system, or any of a variety of other geographic position sensors.

Sensors 408 can also include various other types of sensors 428. Sensors 208 can also include various other types of sensors 228.

Control system 414 can include one or more controllers 435 (e.g., electronic control units, which may include or be implemented by one or more processors, such as one or more processors 402) that generate control signals to control one or more components of a harvester 100 or components of system 500, or both. For example, but not by limitation, controllers 435 can include, a communication system controller to control communication system 406, an interface controller to control one or more interface mechanisms (e.g., 418 or 364, or both), a propulsion controller to control propulsion subsystem 450 to control a travel speed of a harvester 100, a path planning controller to control steering subsystem 452 to control a route or heading of a harvester 100, and one or more actuator controllers to control operation of actuators 454. In other examples, a central controller 435 can be used to generate control signals to control a plurality of the controllable subsystems 416 as well, in some examples, other items of system 500.

Control system 214 can include a variety of controllers 235 (e.g., electronic control units, which may include or be implemented by one or more processors, such as one or more processors 202) that generate control signals to control one or more components of a receiving machine 200 or components of system 500, or both. For example, but not by limitation, controllers 235 can include a communication system controller to control communication system 206, an interface controller to control one or more interface mechanisms (e.g., 218 or 364, or both), a propulsion controller to control propulsion subsystem 250 to control a travel speed of a receiving machine 200, and a path planning controller to control steering subsystem 252 to control a route or heading of a material receiving machine 200. In other examples, a central controller 235 can be used to generate control signals to control a plurality of the controllable subsystems 216 as well, in some examples, other items of system 500.

Propulsion subsystem 450 includes one or more controllable actuators (e.g., internal combustion engine, motors, pumps, gear boxes, etc.) that drive the ground engaging traction elements (e.g., wheels or tracks) of a harvester 100. Propulsion subsystem 250 includes one or more controllable actuators (e.g., internal combustion engine, motors, pumps, gear boxes, etc.) that drive the ground engaging traction elements (e.g., wheels or tracks) of a receiving machine 200.

Steering subsystem 452 includes one or more controllable actuators (e.g., electric actuators, hydraulic actuators, etc.) that are controllably actuatable to control the steering and thus, the heading of a harvester 100. Steering subsystem 252 includes one or more actuators (e.g., electric actuators, hydraulic actuators, etc.) that are controllably actuatable to control the steering and thus, the heading of a receiving machine 200.

Actuators 454 include a variety of different types of actuators that control operation of one or more components of a harvester 100. Actuators 454 may include actuators that control the position or orientation of components of a harvester 100 as well as actuators that control a speed of components of a harvester 100. Actuators 454 can include, without limitation, motors, valves, pumps, hydraulic actuators (e.g., hydraulic cylinders, etc.), pneumatic actuators (e.g., pneumatic cylinders, etc.), electromechanical actuators (e.g., linear actuators, etc.), as well as various other types of actuators. Some components of a harvester 100 that can be controlled by actuators 454 are described in FIG. 2.

Communication system 406 is used to communicate between components of a harvester 100 or with other items of system 500, such as remote computing systems 300, receiving machines 200, or other harvesters 100, or a combination thereof. Communication system 206 is used to communicate between components of a receiving machine 200, or with other items of system 500, such as remote computing systems 300, harvesters 100, or other receiving machines 200, or a combination thereof. Communication system 306 is used to communicate between components of a remote computing system 300 or with other items of system 500, such as harvesters 100, receiving machines 200, or other remote computing systems 300, or a combination thereof.

Communication systems 206, 306, and 406 can each include one or more of wired communication circuitry or wireless communication circuitry, as well as wired and wireless communication components. In some examples, communication systems 206, 306, and 406 can each be one or more of a system for communicating over the Internet, a system for communicating over a cellular network, a system for communicating over a wide area network or a local area network, a system for communicating over a controller area network (CAN), such as a CAN bus, a system for communicating over a controller area network flexible data-rate (CAN FD), such as CAN FD bus, a system for communicating over a near field communication network, a system for communicating over ethernet, or a communication system configured to communicate over any of a variety of other networks. Communication systems 206, 306, and 406 can each also include a system that facilitates downloads or transfers of information to and from a secure digital (SD) card or a universal serial bus (USB) card, or both. Communication systems 206, 306, and 406 can each utilize networks 359. Networks 359 can be any of a wide variety of different types of networks such as the Internet, a cellular network, a wide area network (WAN), a local area network (LAN), a controller area network (CAN), a controller area network flexible data-rate (CAN FD), a near-field communication network, ethernet, or any of a wide variety of other networks.

FIG. 3 also shows that remote computing systems 300 include yield prediction and operation planning system 310. Yield prediction and operation planning system 310 obtains various data and generates one or more yield values corresponding to a worksite and generates, based on the yield values, operation plan outputs that can be used in the control of one or more harvesters 100, one or more receiving machines 200, as well as in the control of one or more other items of system 500. Yield prediction and operation planning system 310 will be discussed in more detail in FIG. 4.

FIG. 3 also shows remote users 366 interacting with harvesters 100, receiving machines 200, and remote computing systems 300 through user interface mechanisms 364 over networks 359. In some examples, user interface mechanisms 364 may include joysticks, levers, a steering wheel, linkages, pedals, buttons, wireless devices (e.g., mobile computing devices, etc.), dials, keypads, a display device (including a display screen), user actuatable elements (such as icons, buttons, etc.) on a display device, a microphone and speaker (where speech recognition and speech synthesis are provided), among a wide variety of other types of control devices. Where a touch sensitive display system is provided, the users 366 may interact with user interface mechanisms 364 using touch gestures. Additionally, at least some of the user interface mechanisms 364 can be used to present (e.g., display, audible presentation, haptic presentation, etc.) various information, including information based on (or indicative of) the yield values or operation plans, or both, generated by yield prediction and operation planning system 310. These examples described above are provided as illustrative examples and are not intended to limit the scope of the present disclosure. Consequently, other types of user interface mechanisms 364 may be used and are within the scope of the present disclosure.

FIG. 3 also shows that one or more operators 361 may operate harvesters 100 and receiving machines 200. The operators 361 interact with operator interface mechanisms 418 or operator interface mechanisms 218. In some examples, operator interface mechanisms 418 and operator interface mechanisms 218 may each include joysticks, levers, a steering wheel, linkages, pedals, buttons, wireless devices (e.g., mobile computing devices, etc.), dials, keypads, a display device (including a display screen), user actuatable elements (such as icons, buttons, etc.) on a display device, a microphone and speaker (where speech recognition and speech synthesis are provided), among a wide variety of other types of control devices. Where a touch sensitive display system is provided, the operators 361 may interact with operator interface mechanisms 418 and operator interface mechanisms 218 using touch gestures. Additionally, at least some of the operator interface mechanisms 418 and operator interface mechanisms 218 can be used to present (e.g., display, audible presentation, haptic presentation, etc.) various information, including the yield values or operation plans, or both, generated by yield prediction and operation planning system 310. These examples described above are provided as illustrative examples and are not intended to limit the scope of the present disclosure. Consequently, other types of operator interface mechanisms 418 and operator interface mechanisms 218 may be used and are within the scope of the present disclosure.

Remote computing systems 300 can be a wide variety of different types of systems, or combinations thereof. For example, remote computing systems 300 can be in a remote server environment. Further, remote computing systems 300 can be remote computing systems, such as mobile devices, a remote network, a farm manager system, a vendor system, or a wide variety of other remote systems. In one example, harvesters 100 can be controlled remotely by remote computing systems 200 or by remote users 366, or both. In one example, receiving machines 200 can be controlled remotely by remote computing systems 300 or by remote users 366, or both. In some examples, operators 361 are on-board (e.g., in an operator compartment, such as a cab) the machines (e.g., 100 or 200). In some examples, operators 361 are remote from the machines (e.g., 100 or 200) and control the machines through one or more interface mechanisms (e.g. one or more of 418 and one or more of 218) which are remote from the machines but operatively coupled (e.g., communicatively coupled, such as over networks 359) to the machines.

In some examples, one or more of the components shown in FIG. 3 as being located at one location can, in other examples, be located elsewhere, or at a combination of locations. For example, but not by limitation, in some examples, yield prediction and operation planning system, shown in FIG. 3 as being located at remote computing systems 300, can additionally, or alternatively, be located elsewhere, such as at harvesters 100 or at receiving machines 200, or both. Thus, it will be understood that the items in system 500 can be distributed in various ways, including ways that differ from the example shown in FIG. 3.

Figure 4:
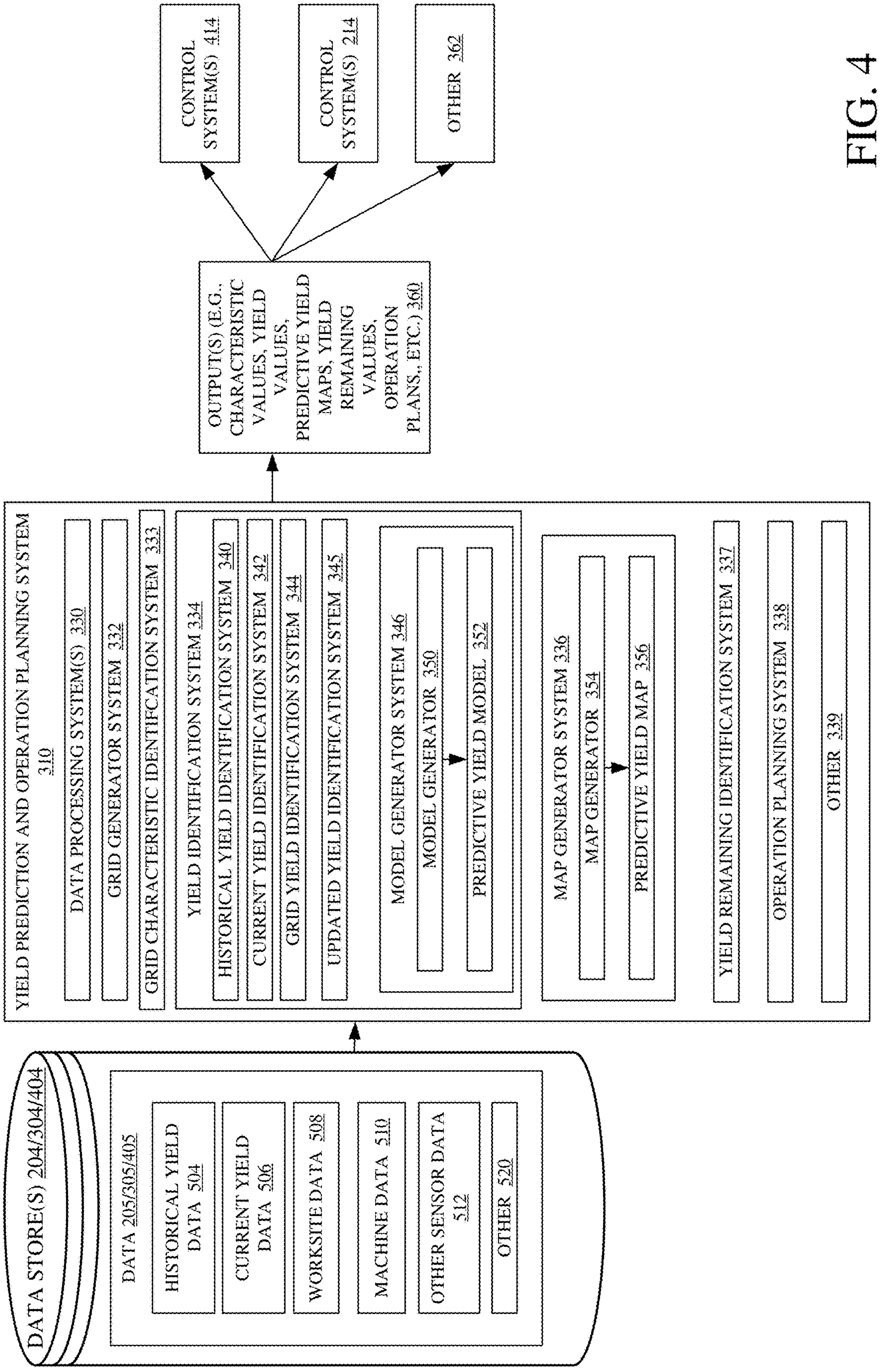
FIG. 4 is a block diagram showing some examples of components of the agricultural system architecture, including yield prediction and operation planning system, in more detail.

FIG. 4 is a block diagram that shows examples of some of the components of agricultural system architecture 500 in more detail and information flow between the components.

As illustrated in FIG. 4, it can be seen that data stores 204, data stores 304, data stores 404, or a combination thereof, can include as data (205, 305, and 405, respectively), historical yield data 504, current yield data 506, worksite data 508, machine data 510, other sensor data 512, and can include various other data 520, including, but not limited to, various other data described herein.

As shown in FIG. 4, yield prediction and operation planning system 310 (also referred to herein as system 310) includes one or more data processing systems 330, grid generator system 332, grid characteristic identification system 333, yield identification system 334, map generator system 336, yield remaining identification system, operation planning system 338, and can include various other items and functionality 339. Yield identification system 334, itself, includes historical yield identification system 340, current yield identification system 342, grid yield identification system 344, updated yield identification system 345, and model generator system 346. Model generator system 346, itself, includes a model generator 350 that generates a predictive yield model 352. Map generator system 336, itself, includes a map generator 354 that generates a predictive yield map 356 (as will be described in FIG. 7).

Historical yield data 504 includes historical yield values corresponding to a worksite from one or more prior harvesting operations at the worksite. The historical yield data 504 can be based on or derived from sensor data generated by sensors (e.g., mass flow sensors, fill level sensors, etc.) on-board harvesters that conducted the prior harvesting operation at the worksite. Historical yield data 504 can be provided in other ways.

Current yield data 506 includes sensor data generated by sensors on-board the harvesters 100 conducting a current harvesting operation at the worksite, such as sensor data generated by mass flow sensors 424 or sensor data generated by fill level sensors 426, or both.

Worksite data 508 includes data of characteristics corresponding to the worksite and can be georeferenced to different geographic locations across the worksite. The data can include values of each of the various characteristics. Such characteristics can include weather characteristics (e.g., precipitation levels (amount) and types, wind levels (speed) and directions, sun availability, etc.). The weather characteristics can include weather characteristics for a season relative to a crop being harvested during a current harvesting operation and can correspond the worksite of a current harvesting operation. Such characteristics can include crop type (e.g. species, hybrid, cultivar, etc.) for a crop being harvested during a current harvesting operation. Such characteristics can include crop health (e.g., vegetation index values, such as normalized difference vegetation index (NDVI) values, etc.) for a crop being harvested during a current harvesting operation. Such characteristics can include terrain characteristics, such as topography (e.g., elevation, slope, etc.), soil characteristics (e.g., soil moisture, soil type, soil compaction, etc.), as well as various other terrain characteristics for a worksite corresponding to a current harvesting operation. Such characteristics can include various other characteristics. Worksite data 508 can be in the form of maps of the worksite, or in various other forms of georeferenced data. Worksite data 508 can be derived from sensor data generated by sensors on machines that operated at the worksite, aerial sensor systems (e.g., satellite, drone, etc.), operator or user inputs, third-party providers, as well as various other sources.

Machine data 510 includes data indicative of machine characteristics of the one or more agricultural work machines performing or available to perform in a current harvesting operation. Machine characteristics can include material (e.g., grain) carrying capacity, dimensions (e.g., width, length, height, etc.) of the machines and of components of the machines, as well as various other machine characteristics. Machine data 510 can be provided by operator or user input, third-party providers (e.g., manufacturer, dealer, etc.), as well as various other sources.

Other sensor data 512 includes sensor data generated by sensors 208 or 408 not included as part of current yield data 506. For example, other sensor data 512 can include sensor data generated by heading/speed sensors 225, sensor data generated by geographic position sensors 203, sensor data generated by sensors 228, sensor data generated by heading/ speed sensors 425, sensor data generated by geographic position sensors 403, and sensor data generated by other sensors 428.

Data processing systems 330 processes historical yield data 504, current yield data 506, worksite data 508, machine data 510, other sensor data 512, and other data 520 to generate (or derive) computer readable values, readable by other components of system 310. Data processing system 330 can include image processing functionality, sensor signal processing functionality, filtering functionality, categorization functionality, normalization functionality, aggregation functionality, as well as various other data processing functionalities.

Figure 5:
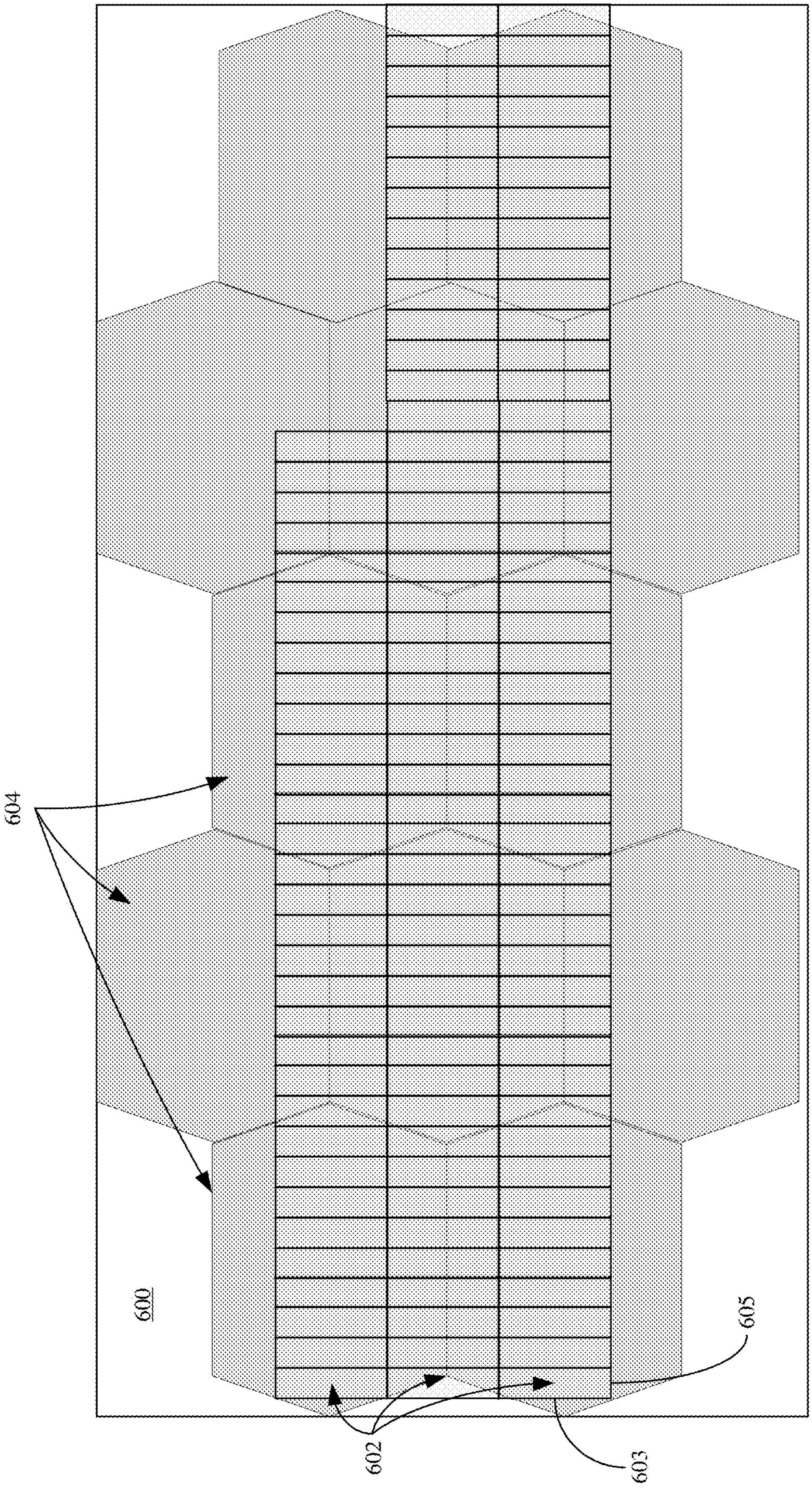
FIG. 5 is a pictorial illustration showing one example of a worksite with generated grids.

Grid generator system 332 is operable to generate various grids corresponding to a worksite. Conversation will turn to FIG. 5 which is a pictorial illustration showing one example of grids generated by grid generator system 332 corresponding to a worksite. As shown in FIG. 5, grid generator 332 has generated a plurality of first-type grids (e.g., polygonal (e.g., rectangular) grids) 602 and a plurality of second-type grids (e.g. hexagonal grids) 604 corresponding to a worksite 600 at which a current harvesting operation is being performed. In the example shown, each first-type (e.g., polygonal) grid 602 corresponds to an area covered by a harvester 100 and has a width 603 (transverse to the travel direction of the harvester) corresponding to a width of a harvester 100 (e.g., width of a header of the harvester 100) and a length 605 (parallel to the travel direction of the harvester) corresponding to an area covered by the harvester 100 in a given amount of time. In one example, a first-type (e.g., polygonal) grid 602 is generated once every two-hundred milliseconds and thus, has a length corresponding to the area covered by the harvester 100 in two-hundred milliseconds (which can be derived based on detected (e.g., by sensors 425) travel speed and heading of the harvester). Each second-type (e.g., hexagonal) grid 604 corresponds to an arca of the worksite 605 (that area being larger than the area of each first-type (e.g., polygonal) grid 602). The second-type (e.g., hexagonal) grids 604 are overlaid or underlaid the first-type (e.g., polygonal) grids 602 and can be located based on the geographic locations corresponding to the first type (e.g., polygonal) grids 602 (as derived from sensor data from sensors 403). As will be described in more detail herein, the grid generation provides for the generation of predictive yield values at the worksite. It will be understood that while polygonal and hexagonal grids are shown in examples herein, in other examples, other forms of grids can be used (e.g., grids in other examples can be shapes other than those shown in FIG. 5). Further, it will be understood that first-type and second-type are used to denote that there is at least some difference between grids of the first-type and grids of the second-type, for example, the first-type and second-type grids can differ in one or more of size, shape, corresponding geographic area. However, in some examples, first-type and second-type grids can be the same or similar in some respects, for instance, but not by limitation, first-type and second-type grids could be the same shape but of different sizes.

Conversation now returns to FIG. 4.

Grid characteristic identification system 333 is operable to identify values of characteristics for each grid generated by grid generator system 332, including values of characteristics for each second-type (e.g., hexagonal) grid generated by grid generator system 332, based on worksite data 608. The characteristic value for each characteristic for each second-type (e.g., hexagonal) grid may be an aggregation of multiple characteristic values for the characteristic corresponding to the geographic area of the second-type (e.g., hexagonal) grid (e.g., an average of the values of the characteristic). Grid characteristic identification system 332 can identify, for each second-type (e.g., hexagonal) grid 334, a value of each of a plurality of terrain characteristics, a value of each of a plurality weather characteristics, a crop type value, a crop health value, as well as a value of each of a plurality of other characteristics as provided by worksite data 508.

Yield identification system 334 is operable to identify (e.g., generate, determine, etc.) one or more yield values corresponding to a worksite.

Historical yield identification system 340 is operable to identify one or more historical yield values corresponding to a worksite based on historical yield data 504. As an example, historical yield identification system 340 can identify a historical yield value corresponding to an area of the worksite. In one example, historical yield identification system 340 can identify a historical yield value corresponding to each grid generated by grid generator system 332, including a historical yield value corresponding to each second-type (e.g., hexagonal) grid 604 generated by grid generator 332. A historical yield value corresponding to a second-type (e.g., hexagonal) grid 604 (also referred to as a historical second-type (e.g., hexagonal) grid yield value) can be result of aggregation of a plurality of historical yield values corresponding to the area of the worksite to which the second-type (e.g., hexagonal) grid 604 corresponds.

Current yield identification system 342 is operable to identify one or more current yield values corresponding to a worksite based on current yield data 506. As an example, current yield identification system 342 can identify a yield value for each first-type (e.g., polygonal) grid 602 generated by grid generator system 332. A current yield value can also be the most recently calculated yield value (e.g., the yield value calculated for a most recent first-type (e.g., polygonal) grid 602). Current yield identification system 342 is operable to identify a current yield value corresponding to a second-type (e.g., hexagonal) grid (also referred to as a current second-type (e.g., hexagonal) grid yield value) by upscaling a yield value corresponding to a first-type (e.g., polygonal) grid 602 (e.g., the most recent first-type (e.g., polygonal) grid) overlapping the second-type (e.g., hexagonal) grid 604 in correspondence with a remaining area of the second-type (e.g., hexagonal) grid 604 (e.g., remaining area of the second-type (e.g., hexagonal) grid being the total area of second-type (e.g., hexagonal) grid 604 less the area of interaction between the first type (e.g., polygonal) grid 602 and the second-type (e.g., hexagonal) grid 604).

Grid yield identification system 344 is operable to identify a yield value corresponding to each second-type (e.g., hexagonal) grid 604 (referred to as a second-type (e.g., hexagonal) grid yield value) based on an area of interaction between one or more first-type (e.g., polygonal) grids 602 that overlap the second-type (e.g., hexagonal) grid 604 and the yield value (as identified by current yield identification system) for each overlapping first-type (e.g., polygonal) grid 602. The area of interaction between overlapping first-type (e.g. polygonal) grids 602 and the second-type (e.g., hexagonal) grid 604 can be calculated based on geographic location information and the known dimensions of the grids. For example, suppose (for the sake of illustration) that the area of interaction between an overlapping first-type (e.g., polygonal) grid 602 and a second-type (e.g., hexagonal) grid 604 is 40 percent (e.g., 40 percent of the first-type (e.g., polygonal) grid 602 overlaps the second-type (e.g., hexagonal) grid 604). It will be understood that the area of interaction can be represented by values other than percentage, such as land area values (e.g., acres, square feet, etc.). The yield value for the first-type (e.g., polygonal) grid could be, for example, 0.4 bushels. Thus, in one example, by aggregation, the yield value for the area of intersection would be 0.16 bushels (e.g., 40 percent of the yield value corresponding to the first-type (e.g., polygonal) grid 602 (or 0.16 bushels) corresponds to the area of interaction). A yield value for the area of interaction can be calculated for each overlapping first-type (e.g., polygonal) grid 602 corresponding to the second-type (e.g., hexagonal) grid 604. The plurality of yield values for the areas of interaction, for, each second-type (e.g., hexagonal) grid 604, can be aggregated (e.g. summed), to generate an aggregated yield value for the total area of interaction between the corresponding overlapping first-type (e.g., polygonal) grids 602 and the second-type (e.g., hexagonal) grid 604. The aggregated yield value for the total area of interaction between the corresponding overlapping first-type (e.g., polygonal) grids 602 and the second-type (e.g., hexagonal) grid 604 can be upscaled, in correspondence with the remaining area of the second-type (e.g., hexagonal) grid 604, to generate a second-type (e.g., hexagonal) grid yield value corresponding to the second-type (e.g., hexagonal) grid 604 (e.g., remaining area of the second-type (e.g., hexagonal) grid being the total area of second-type (e.g., hexagonal) grid 604 less the total area of interaction between the first-type (e.g., polygonal) grids 602 and the second-type (e.g., hexagonal) grid 604).

Updated yield identification system 345 is operable to identify an updated (or corrected) yield value corresponding to a second-type (e.g., hexagonal) grid 604 (also referred to as updated (or corrected) second-type (e.g., hexagonal) grid yield value) based on the second-type (e.g., hexagonal) grid yield value (identified by system 344) corresponding to the second-type (e.g., hexagonal) grid 604, the historical second-type (e.g., hexagonal) grid yield value (identified by system 340) corresponding to the second-type (e.g., hexagonal) grid 604, and a current second-type (e.g., hexagonal) grid yield value (identified by system 342) corresponding to the second-type (e.g., hexagonal) grid 604. Thus, the updated (or corrected) second-type (e.g., hexagonal) grid yield value can be said to be a function of the second-type (e.g., hexagonal) grid yield value (identified by system 344), the historical second-type (e.g., hexagonal) grid yield value (identified by system 340), and the current second-type (e.g., hexagonal) grid yield value (identified by system 342) corresponding to the second-type (e.g., hexagonal) grid 604. In some examples, the second-type (e.g., hexagonal grid) yield value (identified by system 344), the historical second-type (e.g., hexagonal) grid yield value (identified by system 340), and the current second-type (e.g., hexagonal) grid yield value (identified by system 342) corresponding to the second-type (e.g., hexagonal) grid 604 are aggregated (e.g., average, weighted average, etc.) to identify the updated (or corrected) second-type (e.g., hexagonal) grid yield value.

In some examples, the current second-type (e.g., hexagonal) grid yield value (identified by system 342) can be replaced by the historical second-type (e.g., hexagonal) grid yield value (identified by system 340), such as in examples where the area of interaction between first-type (e.g., polygonal) grids 602 and the second-type (e.g., hexagonal) grid 604 is less than a given amount (e.g., less than 50% of the total area of the second-type (e.g., hexagonal) grid 604). In such an example, the updated (or corrected) second-type (e.g., hexagonal) grid yield value could be an aggregation (e.g., average, weighted average, etc.) of the second-type (e.g., hexagonal) grid yield value (identified by system 344), the historical second-type (e.g., hexagonal) grid yield value (identified by system 340), the historical second-type (e.g., hexagonal) grid yield value (identified by system 340), corresponding to the second-type (e.g., hexagonal) grid 604. Thus, in such examples, the historical second-type (e.g., hexagonal) grid yield value is used twice.

It will be understood that the process described above, performed by yield identification system 334, can be utilized on each second-type (e.g., hexagonal) grid 604 of the worksite throughout the course of a harvesting operation.

Model generator 350 is operable to generate (e.g., train or retrain) a predictive yield model 352 based on updated (or corrected) second-type (e.g., hexagonal) grid yield values identified by system 345 and the characteristic values for the second-type (e.g., hexagonal) grid 604 identified by system 333. It will be understood that in some examples, the predictive yield model 352 may have been generated and trained based on updated (or corrected) hexagonal yield values and corresponding characteristic values from historical harvesting operations. The updated (or corrected) hexagonal yield values and corresponding characteristic values from the current operation may be further used to retrain and generate an updated predictive yield model 352. In other examples, the predictive yield model 352 may not have been previously generated, and is instead generated based on values corresponding to the current operation and iteratively retrained throughout the course of the current harvesting operation.

Thus, updated (or corrected) second-type (e.g., hexagonal) yield values and corresponding characteristic values constitute training data. Model generator 350 includes, or is configured to execute, one or more machine learning, or artificial intelligence (AI), algorithms such as neural networks, generative AI, as well as various other machine learning, or artificial intelligence, algorithms. As will be understood, in some examples, the training data may be used to correct the model 352 until convergence. That is, the model generator 350 will iteratively repeat the generation of a model, utilizing one or more machine learning, or AI, algorithms, and adjusting of model parameters (e.g., weight, biases, etc.) until the output of the model is sufficiently or otherwise desirably converged with the data used for correction, that is until the difference (or error) between model output yield value and the data used for correction (e.g., an updated (or corrected) second-type (e.g., hexagonal) grid yield value) is sufficiently or otherwise desirably minimal. Convergence results in the generation of predictive yield model 352 (i.e., predictive yield model 352 is a converged model (at least relative to the available or utilized training data)). It will be understood that sufficiently or otherwise desirably, as applied to convergence, can mean, in one example, error is no longer decreasing with each iteration or can mean the error has reached a desired or sufficient minimum level (which may be provided by a user or operator or may be provided in other ways). Throughout the course of the harvesting operation, model generator 350 can retrain, based, at least in part, on the yield values generated during the harvesting operation, to generate an updated predictive yield model 352.

Predictive yield model 352 is thus operable to obtain (e.g., retrieve or receive), as model inputs, a value of each characteristic (to be used as an input into the model, which is dependent on the characteristics used in training) corresponding to a geographic location or arca of the worksite (e.g., a second-type (e.g., hexagonal) grid 604) (as identified by system 333) and generate, as a model output, a predictive yield value for the geographic location or area of the worksite (e.g., the second-type (e.g., hexagonal) grid 604). In one example, the input characteristic values include one or more of a crop health value, a crop type value, a value for each of one or more weather characteristics, a value for each of one or more terrain characteristics, or a value for each of one or more other characteristics.

As can be seen, the predictive yield model 352 is trained based, at least in part, on yield data obtained during the harvesting operation, and can be used to generate predictive yield values for areas of the worksite (e.g., second-type (e.g., hexagonal) grids 604) at which harvesting has not yet been performed, even partially.

Map generator 354 is operable to generate a predictive yield map 356 of the worksite based, at least in part, on the predictive yield values generated by predictive yield model 352. The predictive yield map 356 can show predictive yield values at corresponding geographic locations (or areas), such as at areas corresponding to second-type (e.g., hexagonal) grids 604, not yet harvested (or not yet completely harvested) during the current operation. Additionally, predictive yield map 356 can show recorded yield values for areas already harvested.

Yield remaining identification system 337 is operable to identify a remaining yield value corresponding to the field (also called an estimated bushels remaining value), based on predictive yield values generated by predictive yield model 352. In one example, the remaining yield value can be an aggregation of the predictive yield values corresponding to the unharvested areas of the worksite. In some examples, the remaining geographic areas (e.g., areas corresponding to some of the second-type (e.g., hexagonal) grids 604) may be partially harvested, in which case, the remaining yield value can be an aggregation of the predictive yield values for the remaining geographic areas (e.g., areas corresponding to some of the second-type (e.g., hexagonal) grids 604) less the yield already harvested from those remaining areas (as identified by yield identification system 334). In some examples, the remaining yield value can be an aggregation of the predictive yield values for the entire worksite less the yield already harvested from the worksite (as identified by yield identification system 334).

Operation planning system 338 is operable to output one or more operation plans (e.g., an operation plan for each of a plurality of mobile agricultural work machines (e.g., 100 or 200, or both), based on predictive yield values generated by predictive yield model 352 (which can be in a predictive yield map 356) or a remaining yield value generated by yield remaining identification system 337, or both. An operation plan can include a route or heading for a mobile work machine (e.g., 100 or 200). An operation plan can include machine settings for a mobile work machine (e.g., 100 or 200), such as machine settings at different locations at the worksite or along a route, or both. The machine settings can include machine travel speed as well as settings for each of a plurality of controllable subsystems (e.g., 216 or 416). An operation plan can include a machine assignment assigning a mobile work machine (e.g., 100 or 200) to the worksite or to a particular area of the worksite.

In one example, operation planning system 338 is operable to assign one or more receiving machines 200 to the worksite based on a yield remaining value identified by system 337 and material (e.g., grain) capacity values for each of the one or more receiving machines 200. That is, operation planning system 338 is operable to determine the number of receiving machines 200 needed to finish receiving and transporting the remaining yield and assign the receiving machines 200 accordingly. This can help to reduce downtime and other inefficiencies in the harvesting operation.

Thus, it can be seen that system 310 is operable to produce one or more outputs 360. An output 360 can include one or more characteristic values (e.g., identified by system 333), one or more yield values (e.g., any of the yield values identified by system 334 or predictive yield values generated by predictive yield model 352, or both), one or more predictive yield maps 356, one or more yield remaining values (e.g., identified by system 337), one or more operation plans (e.g., or items thereof such as one or more routes, one or more machine settings, one or more machine assignments), as well as various other information generated by system 310. An output 360 can be obtained (e.g., retrieved or received) by one or more control systems 414 to control one or more harvesters 100 (e.g., one or more controllable subsystems 416, etc.) and by one or more control systems 214 to control one or more material receiving machines 201 (e.g., one or more controllable subsystems 216, etc.). Additionally, or alternatively, an output 360 (or information based thereon) can be presented to one or more operators or one or more users, or both. For example, an output 360 can be obtained (e.g., retrieved or received) by one or more control systems 414 to control one or more interface mechanisms 418 to present (e.g., display, etc.) information of (or based on) the output 360 to one or more operators 361 of one or more harvesters 100 and by one or more control systems 214 to control one or more interface mechanisms 218 to present (e.g., display, etc.) information of (or based on) the output 360 to one or more operators 361 of one or more material receiving machines 200. Additionally, or alternatively, an output 360 can be obtained (e.g., retrieved or received) by various other items and used in various other ways. For example, but not by limitation, an output 360 can be obtained (e.g., retrieved or received) by one or more other items 362, such as one or more interface mechanisms 364 which can present (e.g., display, etc.) information of (or based on) the operation plan output 360 to one or more users 366.

Figure 6A:
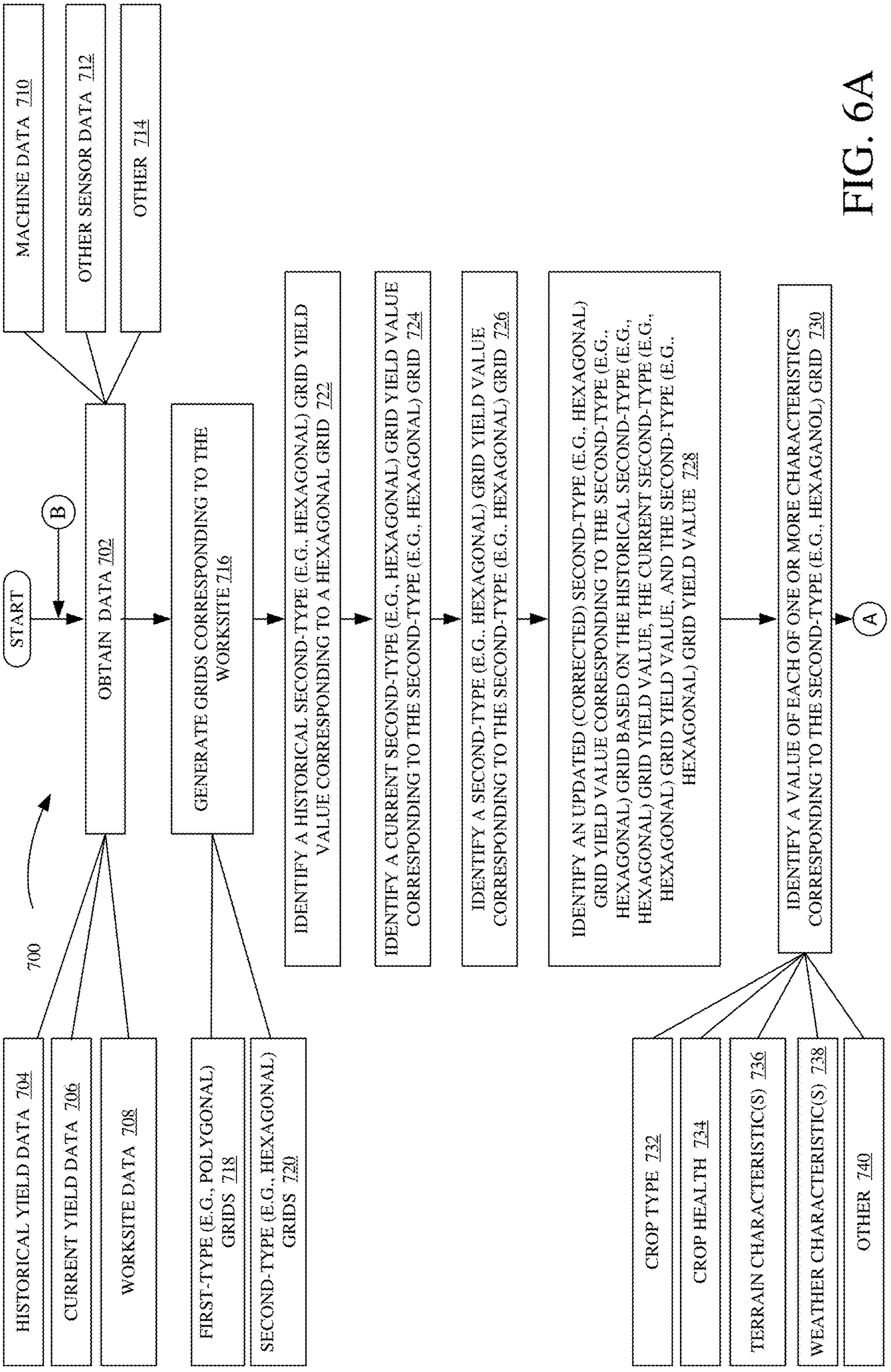
FIGS. 6A and 6B (collectively referred to herein as FIG. 6) show a flow diagram illustrating one example operation of an agricultural system architecture.
Figure 6B:
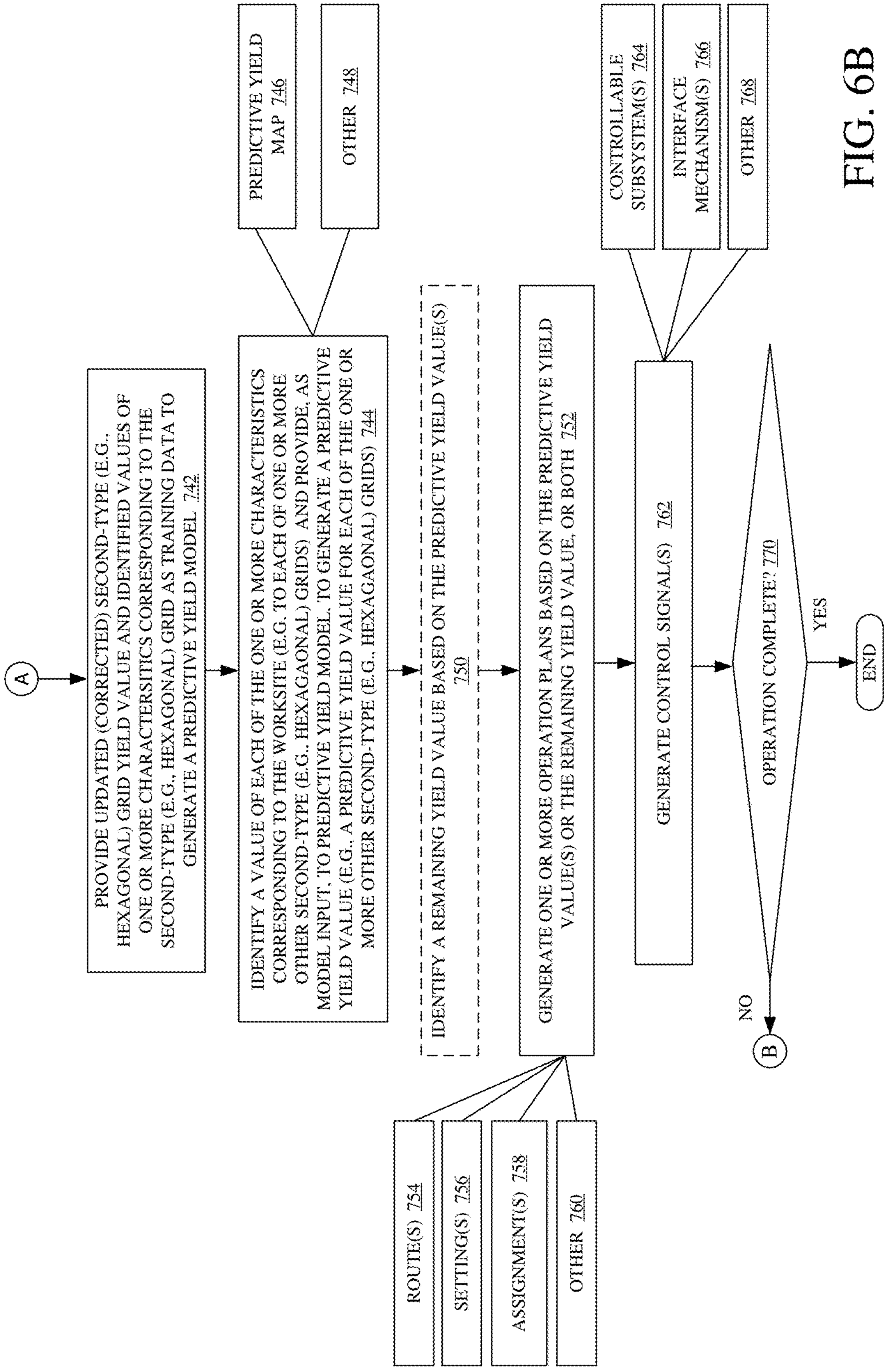

FIGS. 6A and 6B (collectively referred to herein as FIG. 6) show a flow diagram illustrating an example operation 700 of agricultural system 500 in generating one or more outputs and control of one or more mobile agricultural work machines.

At block 702, one or more items of data are obtained by system 500 (e.g., system 310). As indicated by block 704, the one or more items of data can include historical yield data 504. As indicated by block 706, the one or more items of data can include current yield data 506. As indicated by block 708, the one or more items of data can include worksite data 508. As indicated by block 710, the one or more items of data can include machine data 510. As indicated by block 712, the one or more items of data can include other sensor data 512. As indicated by block 714, the one or more items of data can include various other data, such as other data 520.

At block 716, system 310 (e.g., grid generator system 332) generates a plurality of grids corresponding to the worksite. Some examples of generating grids corresponding to the worksite are described in FIGS. 4 and 5. As indicated by block 718, the grids can include one or more first-type (e.g., polygonal) grids 602. As indicated by block 720, the grids can include one or more second-type (e.g., hexagonal) grids 604.

At block 722, system 310 (e.g., historical yield identification system 340) identifies a historical second-type (e.g., hexagonal) grid yield value corresponding to a second-type (e.g., hexagonal) grid. Some examples of identifying a historical second-type (e.g., hexagonal) grid yield value corresponding to a second-type (e.g., hexagonal) grid are described in FIG. 4.

At block 724, system 310 (e.g., current yield identification system 342) identifies a current second-type (e.g., hexagonal) grid yield value corresponding to the second-type (e.g., hexagonal) grid. Some examples of identifying a current second-type (e.g., hexagonal) grid yield value corresponding to a second-type (e.g., hexagonal) grid are described in FIG. 4.

At block 726, system 310 (e.g., grid yield identification system 344) identifies a second-type (e.g., hexagonal) grid yield value corresponding the second-type (e.g., hexagonal) grid. Some examples of identifying a second-type (e.g., hexagonal) grid yield value corresponding to a second-type (e.g., hexagonal) grid are described in FIG. 4.

At block 728, system 310 (e.g., updated yield identification system 345) identifies an updated (or corrected) second-type (e.g., hexagonal) grid yield value corresponding to the second-type (e.g., hexagonal) grid based on the historical second-type (e.g., hexagonal) grid yield value, the current second-type (e.g., hexagonal) grid yield value, and the second-type (e.g., hexagonal) grid yield value. Some examples of identifying an updated (or corrected) second-type (e.g., hexagonal) grid yield value corresponding to the second-type (e.g., hexagonal) grid are described in FIG. 4.

At block 730, system 310 (e.g., grid characteristic identification system 333) identifies a value of each of one or more characteristics corresponding to the second-type (e.g., hexagonal) grid. Some examples of identifying a value of each of one or more characteristics corresponding to a second-type (e.g., hexagonal) grid are described in FIG. 4. As indicated by block 732, a characteristic of the one or more characteristics can be crop type. As indicated by block 734, a characteristic of the one or more characteristics can be crop health. As indicated by block 736, the one or more characteristics can include one or more terrain characteristics. As indicated by block 738, the one or more characteristics can include one or more weather characteristics. As indicated by block 740, the one or more characteristics can include one or more of a variety of other characteristics.

At block 742, system 310 provides the updated (or corrected) second-type (e.g., hexagonal) grid yield value corresponding to the second-type (e.g., hexagonal) grid and the values of each of the one or more characteristic corresponding to the second-type (e.g., hexagonal) grid as training data for a model generator 350 to generate (e.g., train or retrain) a predictive yield model 352. Some examples of providing training data and generating (e.g., training or retraining) a predictive yield model 352 are described in FIG. 4.

At block 744, system 310 (e.g., grid characteristic identification system 333) identifies a value of each of the one or more characteristics corresponding to the worksite, such as to each of one or more other (or different) second-type (e.g., hexagonal) grids and provides the identified values as model inputs to the predictive yield model 352 to generate a predictive yield value (e.g., a predictive yield value for each of the one or more other (or different) second-type (e.g., hexagonal) grids). At block 744, the one or more characteristics will, at least in one example, be the same as the one or more characteristics used as training data at block 742 (though the values may be different). Some examples of providing model inputs and generating predictive yield values are described in FIG. 4. As indicated by block 746, the one or more predictive yield values can be output as part of predictive yield map 356 generated by system 310 (e.g., map generator 354). As indicated by block 748, the one or more predictive yield values can be output in other ways.

Optionally, at block 750, system 310 (e.g., yield remaining identification system 337) identifies a yield remaining value (also referred to as an estimated bushels remaining value) indicative of a remaining (unharvested) amount of yield (bushels) at the worksite. Some examples of identifying a yield remaining value are described in FIG. 4.

At block 752, system 310 (operation planning system 338) generates one or more operations plans, each corresponding to an agricultural work machine (e.g., 100 or 200), based on the one or more predictive yield values or the yield remaining value, or both. Some examples of generating one or more operation plans are described in FIG. 4. As indicated by block 754, an operation plan can include a prescribed route (or heading) for an agricultural work machine. As indicated by block 756, an operation plan can include one or more prescribed machine settings for an agricultural work machine. As indicated by block 758, an operation plan can include an assignment for an agricultural work machine. As indicated by block 760, an operation plan can include other items as well.

At block 762, system 500 generates one or more control signals and controls one or more items of system 500 based on outputs 360 (e.g., predictive yield value(s), predictive yield map(s), yield remaining value(s), operation plan(s), etc.) of system 310. As indicated by block 764, a control system 414, for each of one or more harvesters 100, can generate one or more control signals and control one or more controllable subsystems 416. As further indicated by block 764, a control system 214, for each of one or more receiving machines 200, can generate one or more control signals and control one or more controllable subsystems 216. As indicated by block 766, one or more interface mechanisms (e.g., one or more of each of interface mechanisms 218, 418, or 364) can be controlled to generate (e.g., present) information of (or based) on the outputs 360 of system 310. As indicated by block 768, one or more other items of system 500 can be controlled based on outputs 360.

At block 770 it is determined if the operation is complete. Determining if the operation is complete can, in some examples, include determining if additional current yield data 506 for the worksite has been obtained or is to be obtained. If the currently underway operation is not complete, then processing returns to block 702. It will be understood, as previously described, that, with processing returning to block 702, additional values are identified for other areas (e.g., second-type (e.g., hexagonal) grids of the worksite) as harvesting continues which can be used to dynamically re-train the predictive yield model 352 during the harvesting operation and to identify predictive yield values (including updated predictive yield values). If, at block 770, it is determined that the operation is complete then processing ends.

The present discussion has mentioned processors and servers. In some examples, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms may include text boxes, check boxes, icons, links, drop-down menus, search boxes, etc. The user actuatable operator interface mechanisms can also be actuated in a wide variety of different ways. For instance, they can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition may be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores May be local to the systems accessing the data stores, one or more of the data stores may all be located remote form a system utilizing the data store, or one or more data stores may be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It will be noted that the above discussion has described a variety of different systems, generators, models, controllers, components, and interactions. It will be appreciated that any or all of such systems, generators, models, controllers, components, and interactions may be implemented by hardware items, such as one or more processors, one or more processors executing computer executable instructions stored in memory, memory, or other processing components, some of which are described below, that perform the functions associated with those systems, generators, models, controllers, components, or interactions. In addition, any or all of the systems, generators, models, controllers, components, and interactions may be implemented by software that is loaded into a memory and is subsequently executed by one or more processors or one or more servers or other computing component(s), as described below. Any or all of the systems, generators, models, controllers, components, and interactions may also be implemented by different combinations of hardware, software, firmware, etc., some examples of which are described below. These are some examples of different structures that may be used to implement any or all of the systems, generators, models, logic, controllers, components, and interactions described above. Other structures may be used as well.

Figure 7:
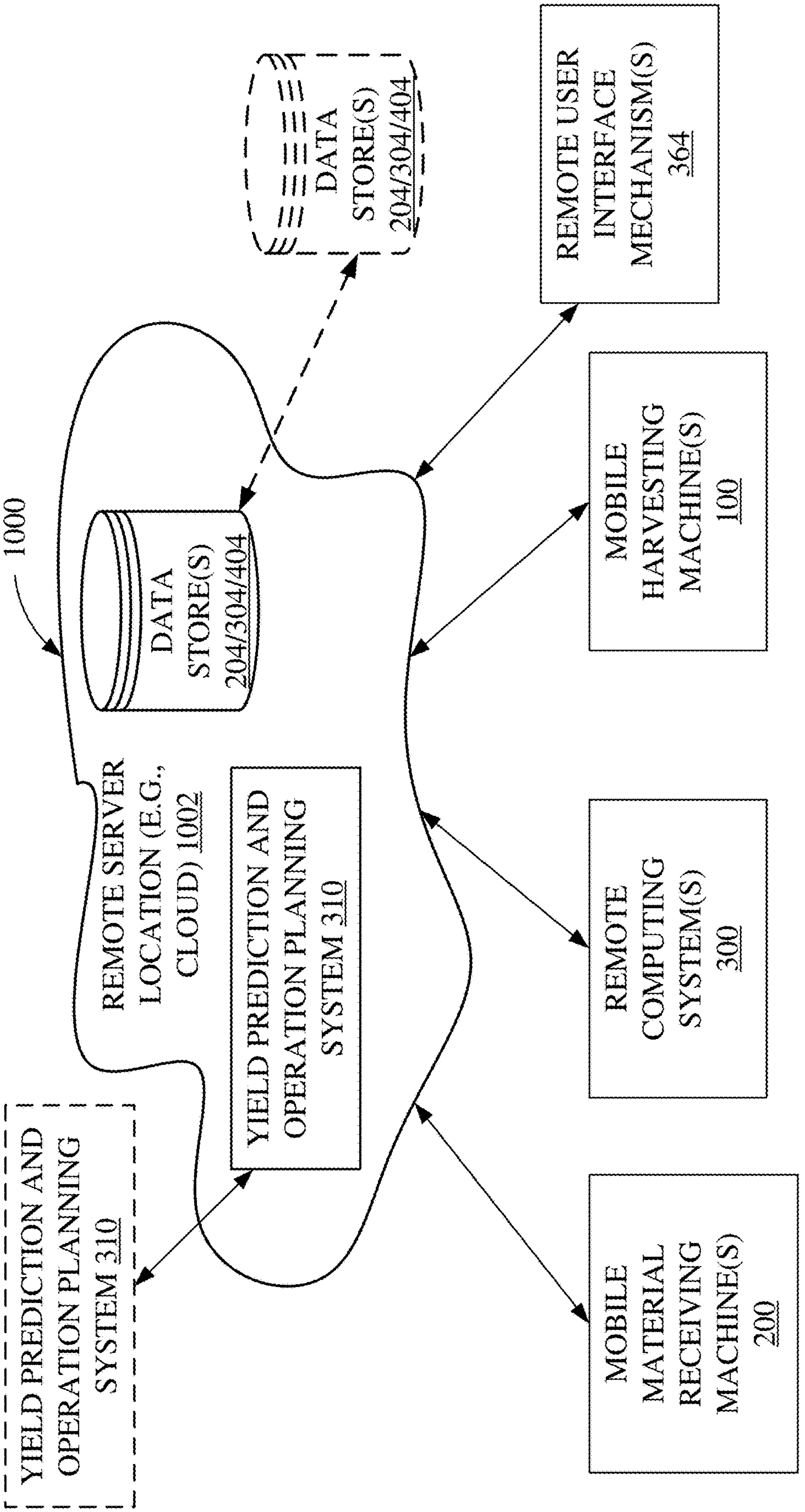
FIG. 7 is a block diagram showing one example of items of an agricultural system architecture in communication with a remote server architecture.

FIG. 7 is a block diagram of a remote server architecture 1000. FIG. 7, also shows one or more harvesters 100, one or more receiving machines 200, one or more remote computing systems 300, and one or more remote user interface mechanisms 364 in communication with the remote server environment. The harvesters 100, receiving machines 200, remote computing systems 300, and remote user interface mechanisms 364 communicate with elements in a remote server architecture 1000. In some examples, remote server architecture 1000 provides computation, software, data access, and storage services that do not require end-user knowledge of the physical location or configuration of the system that delivers the services. In various examples, remote servers may deliver the services over a wide area network, such as the internet, using appropriate protocols. For instance, remote servers may deliver applications over a wide area network and may be accessible through a web browser or any other computing component. Software or components shown in previous figures as well as data associated therewith, may be stored on servers at a remote location. The computing resources in a remote server environment may be consolidated at a remote data center location, or the computing resources may be dispersed to a plurality of remote data centers. Remote server infrastructures may deliver services through shared data centers, even though the services appear as a single point of access for the user. Thus, the components and functions described herein may be provided from a remote server at a remote location using a remote server architecture. Alternatively, the components and functions may be provided from a server, or the components and functions can be installed on client devices directly, or in other ways.

In the example shown in FIG. 7, some items are similar to those shown in previous figures and those items are similarly numbered. FIG. 7 specifically shows that predictive yield and operation planning system 310, data stores 204, data stores 304, or data stores 404, or a combination thereof, may be located at a server location 1002 that is remote from harvesters 100, receiving machines 200, remote computing systems 300, and remote user interface mechanisms 364. Therefore, in the example shown in FIG. 7, harvesters 100, receiving machines 200, remote computing systems 300, and remote user interface mechanisms 364 access systems through remote server location 1002. In other examples, various other items may also be located at server location 1002, such as various other items of agricultural system architecture 500.

FIG. 7 also depicts another example of a remote server architecture. FIG. 7 shows that some elements of previous figures may be disposed at a remote server location 1002 while others may be located elsewhere. By way of example, one or more of data store(s) 204, 304, or 404 may be disposed at a location separate from location 1002 and accessed via the remote server at location 1002. Similarly, predictive yield and operation planning system 310 may be disposed at a location separate from location 1002 and accessed via the remote server at location 1002. Regardless of where the elements are located, the elements can be accessed directly by harvesters 100, receiving machines 200, remote computing systems 300, and remote user interface mechanisms 364 through a network such as a wide area network or a local area network; the elements can be hosted at a remote site by a service; or the elements can be provided as a service or accessed by a connection service that resides in a remote location. Also, data may be stored in any location, and the stored data may be accessed by, or forwarded to, operators, users, or systems. For instance, physical carriers may be used instead of, or in addition to, electromagnetic wave carriers. In some examples, where wireless telecommunication service coverage is poor or nonexistent, another machine, such as a fuel truck or other mobile machine or vehicle, may have an automated, semi-automated or manual information collection system. As a mobile machine (e.g., harvester 100 or receiving machine 200) comes close to the machine containing the information collection system, such as a fuel truck prior to fueling, the information collection system collects the information from the mobile machine (e.g., harvester 100 or receiving machine 200) using any type of ad-hoc wireless connection. The collected information may then be forwarded to another network when the machine containing the received information reaches a location where wireless telecommunication service coverage or other wireless coverage is available. For instance, a fuel truck may enter an area having wireless communication coverage when traveling to a location to fuel other machines or when at a main fuel storage location. All of these architectures are contemplated herein. Further, the information may be stored on a mobile machine (e.g., harvester 100 or receiving machine 200) until the mobile machine enters an arca having wireless communication coverage. The mobile machine (e.g., harvester 100 or receiving machine 200), itself, may send the information to another network.

It will also be noted that the elements of previous figures, or portions thereof, may be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 1000 may include cybersecurity measures. Without limitation, these measures may include encryption of data on storage devices, encryption of data sent between network nodes, authentication of people or processes accessing data, as well as the use of ledgers for recording metadata, data, data transfers, data accesses, and data transformations. In some examples, the ledgers may be distributed and immutable (e.g., implemented as blockchain).

Figure 8:
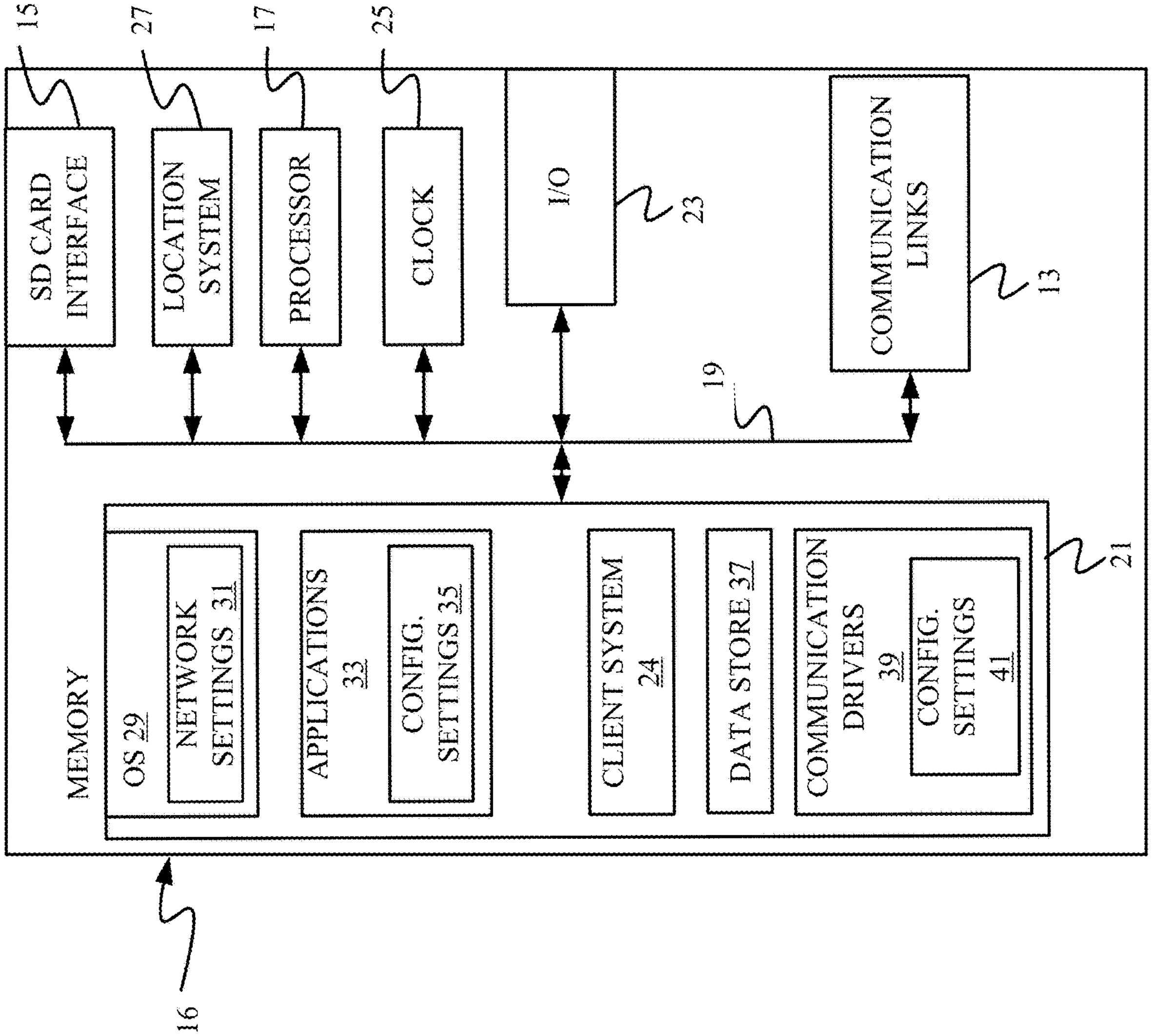
FIGS. 8, 9, and 10 show examples of mobile devices that can be used in an agricultural system architecture.
Figure 9:
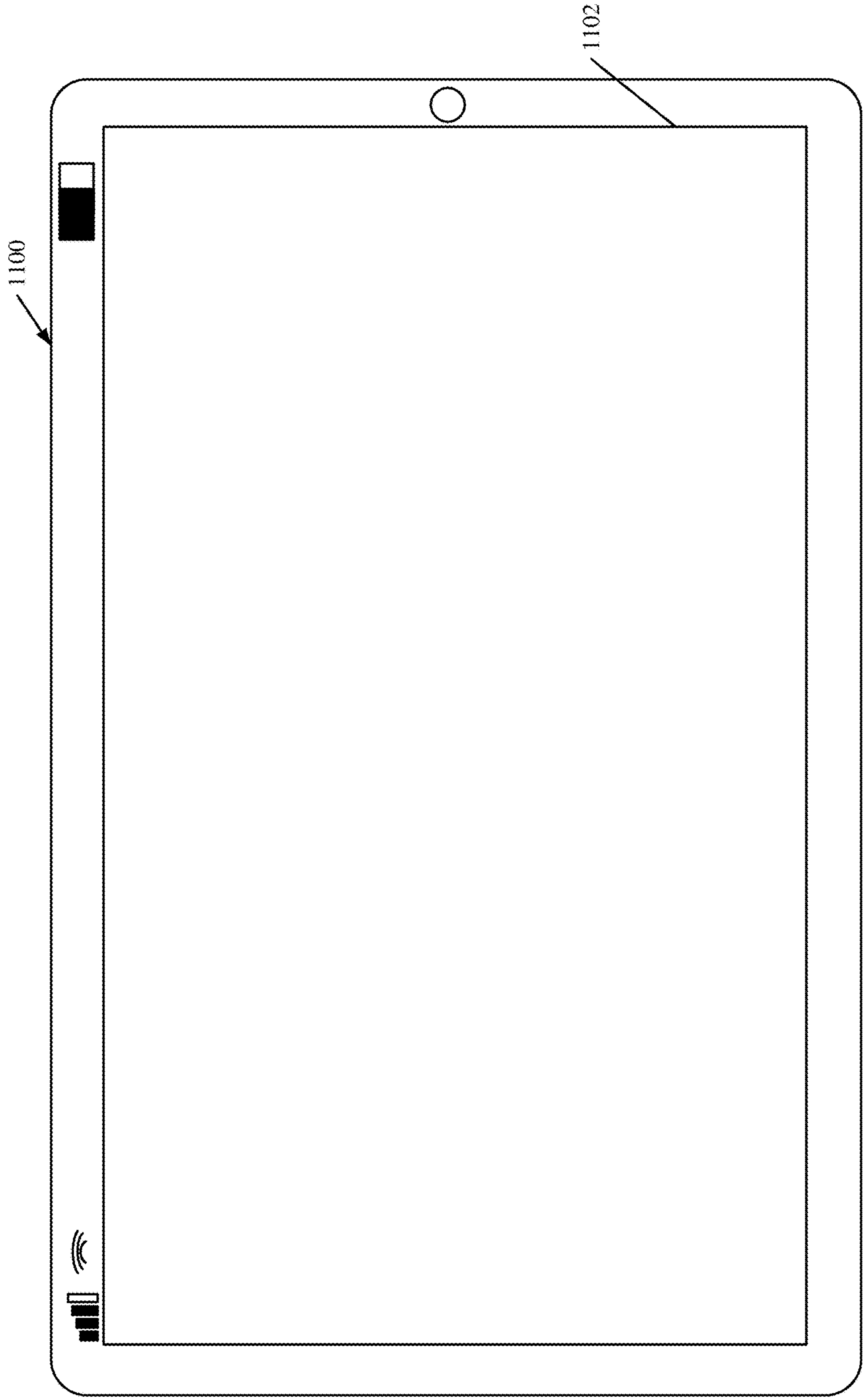
Figure 10:
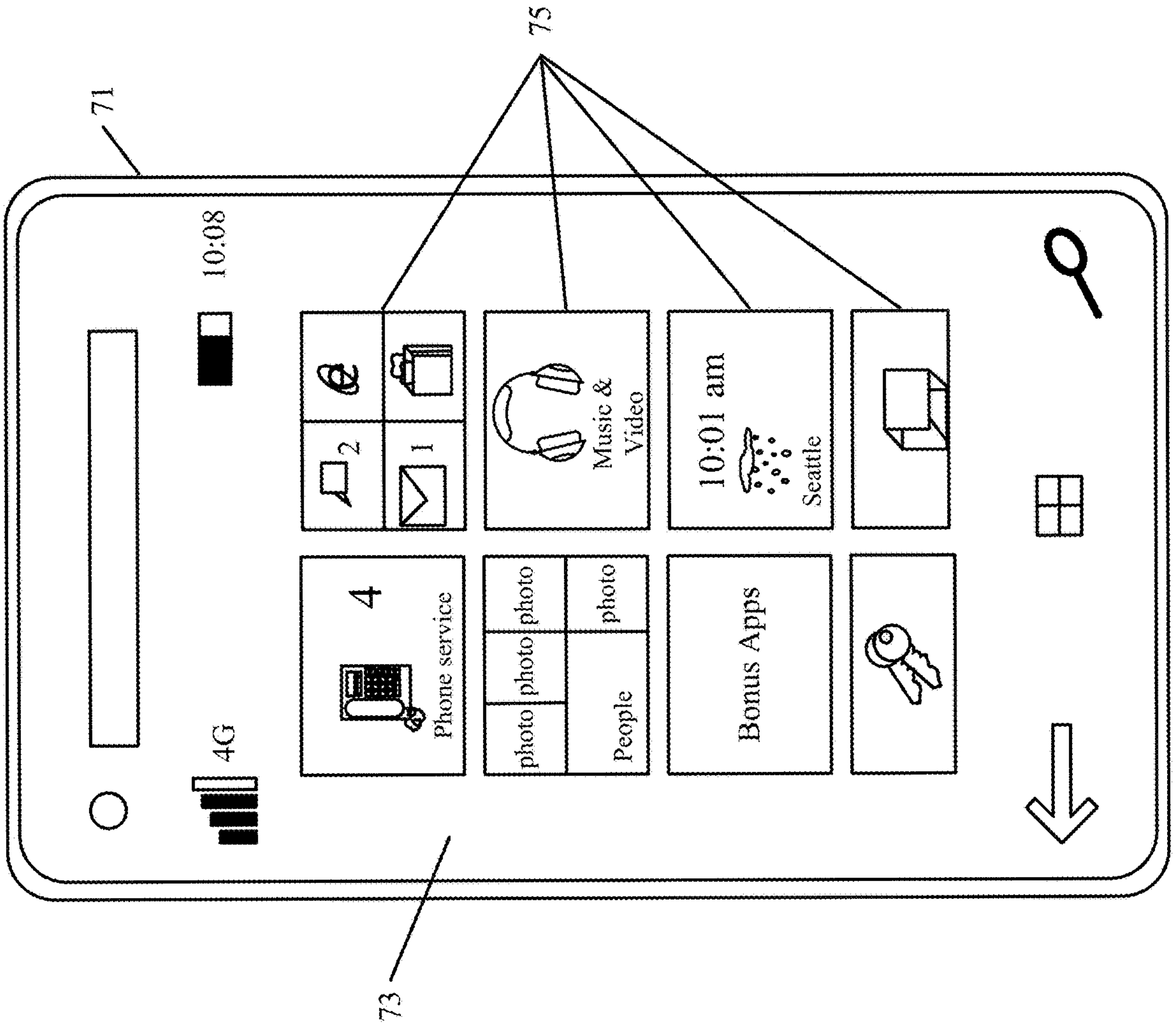

FIG. 8 is a simplified block diagram of one illustrative example of a handheld or mobile computing device that can be used as a user's or client's handheld device 16, in which the present system (or parts of it) can be deployed. For instance, a mobile device can be deployed in the operator compartment of a mobile machine (e.g., harvester 100 or receiving machine 200) for use in generating, processing, or displaying the outputs (e.g., 360) discussed above. FIGS. 9 and 10 are examples of handheld or mobile devices.

FIG. 8 provides a general block diagram of the components of a client device 16 that can run some components shown in previous figures, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other figures) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, client system 24, data store 37, communication drivers 39, and communication configuration settings 41. Memory 21 can include all types of tangible volatile and non-volatile computer-readable memory devices. Memory 21 may also include computer storage media (described below). Memory 21 stores computer readable instructions that, when executed by processor 17, cause the processor to perform computer-implemented steps or functions according to the instructions. Processor 17 may be activated by other components to facilitate their functionality as well.

FIG. 9 shows one example in which device 16 is a tablet computer 1100. In FIG. 9, computer 1100 is shown with user interface display screen 1102. Screen 1102 can be a touch screen or a pen-enabled interface that receives inputs from a pen or stylus. Tablet computer 1100 may also use an on-screen virtual keyboard. Of course, computer 1100 might also be attached to a keyboard or other user input device through a suitable attachment mechanism, such as a wireless link or USB port, for instance. Computer 1100 may also illustratively receive voice inputs as well.

FIG. 10 is similar to FIG. 9 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
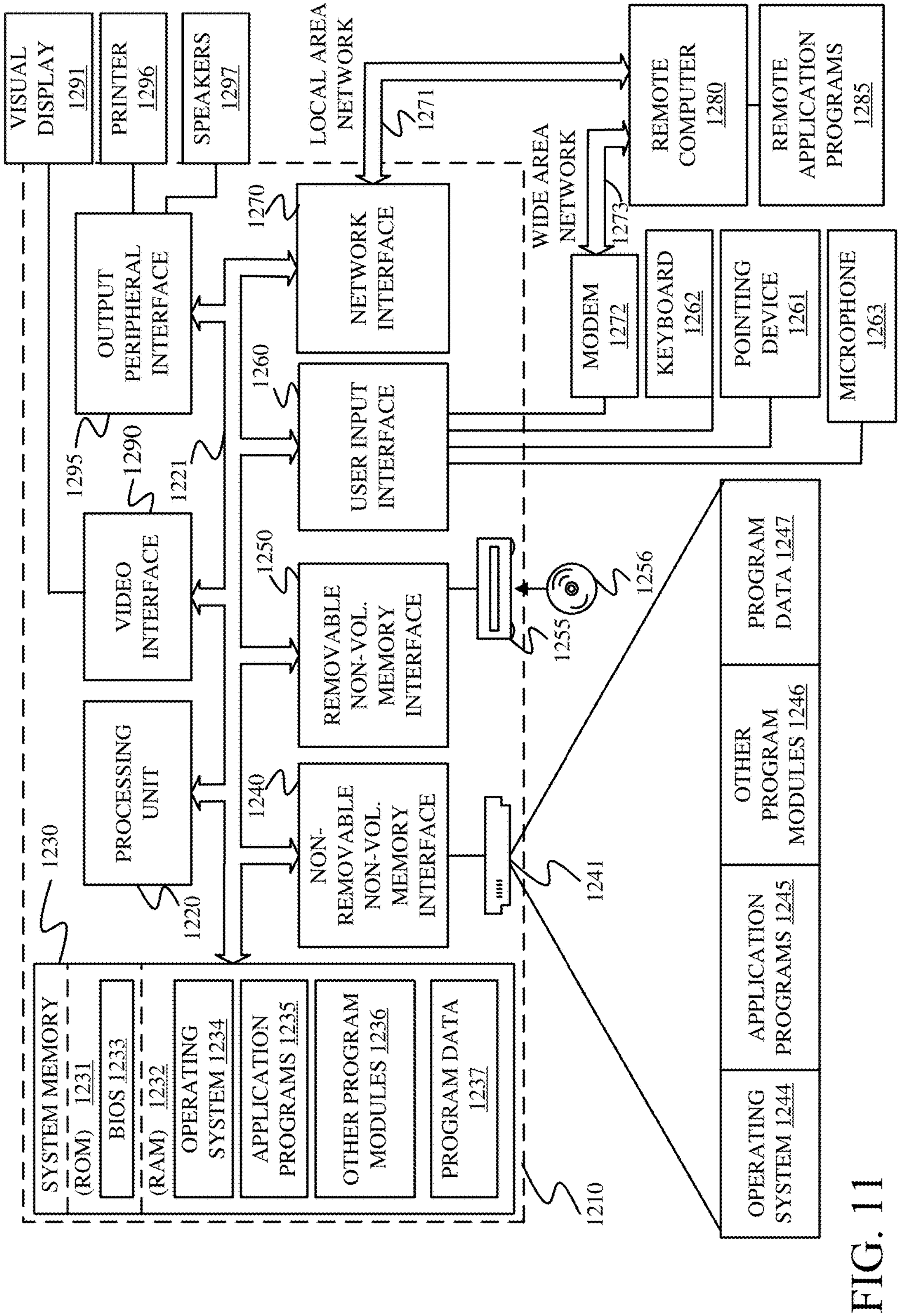
FIG. 11 is a block diagram showing one example of a computing environment that can be used in an agricultural system architecture.

FIG. 11 is one example of a computing environment in which elements of previous figures described herein can be deployed. With reference to FIG. 11, an example system for implementing some embodiments includes a computing device in the form of a computer 1210 programmed to operate as discussed above. Components of computer 1210 may include, but are not limited to, a processing unit 1220 (which can comprise processors or servers from previous figures), a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. Memory and programs described with respect to previous figures described herein can be deployed in corresponding portions of FIG. 11.

Computer 1210 typically includes a variety of computer readable media. Computer readable media may be any available media that can be accessed by computer 1210 and includes 22 both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1230 includes computer storage media in the form of volatile and/or nonvolatile memory or both such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data or program modules or both that are immediately accessible to and/or presently being operated on by processing unit 1220. By way of example, and not limitation, FIG. 11 illustrates operating system 1234, application programs 1235, other program modules 1236, and program data 1237.

The computer 1210 may also include other removable/non-removable volatile/nonvolatile computer storage media. By way of example only, FIG. 11 illustrates a hard disk drive 1241 that reads from or writes to non-removable, nonvolatile magnetic media, an optical disk drive 1255, and nonvolatile optical disk 1256. The hard disk drive 1241 is typically connected to the system bus 1221 through a non-removable memory interface such as interface 1240, and optical disk drive 1255 are typically connected to the system bus 1221 by a removable memory interface, such as interface 1250.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), quantum computers, etc.

The drives and their associated computer storage media discussed above and illustrated in FIG. 11, provide storage of computer readable instructions, data structures, program modules and other data for the computer 1210. In FIG. 11, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237.

A user may enter commands and information into the computer 1210 through input devices such as a keyboard 1262, a microphone 1263, and a pointing device 1261, such as a mouse, trackball or touch pad. Other input devices (not shown) may include a joystick, game pad, satellite dish, scanner, or the like. These and other input devices are often connected to the processing unit 1220 through a user input interface 1260 that is coupled to the system bus, but may be connected by other interface and bus structures. A visual display 1291 or other type of display device is also connected to the system bus 1221 via an interface, such as a video interface 1290. In addition to the monitor, computers may also include other peripheral output devices such as speakers 1297 and printer 1296, which may be connected through an output peripheral interface 1295.

The computer 1210 is operated in a networked environment using logical connections (such as a controller area network-CAN, local area network-LAN, or wide area network WAN) to one or more remote computers, such as a remote computer 1280.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. In a networked environment, program modules may be stored in a remote memory storage device. FIG. 11 illustrates, for example, that remote application programs 1285 can reside on remote computer 1280.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

What is claimed is:

1. An agricultural system comprising:
one or more processors; and
memory storing instructions, executable by the one or more processors, that, when executed by the one or more processors, cause the one or more processors to perform steps comprising:
obtaining historical yield data corresponding to one or more previous harvesting operations at a worksite;
obtaining current yield data detected during a current harvesting operation at the worksite;
obtaining worksite data indicative of one or more characteristics corresponding to the worksite;
generating a predictive yield value corresponding to the worksite based on historical yield data, the current yield data, and the worksite data, wherein generating the predictive yield value comprises:
generating a plurality of first-type grids, each corresponding to a respective location of the worksite, having a corresponding yield value, derived from current yield data; and
generating a plurality of second-type grids, each corresponding to a respective location of the worksite;

identifying a historical second-type grid yield value corresponding to a first second-type grid of the plurality of second-type grids based on the historical yield data;

identifying a current second-type grid yield value corresponding to the first second-type grid based on the corresponding yield value of a first-type grid, of the plurality of first-type grids, at least a portion of the first-type grid overlapping the first second-type grid; and identifying a second-type grid yield value corresponding to the first second-type grid based on the corresponding yield value of each of two or more first-type grids of the plurality of first-type grids, at least a portion of each first-type grid of the two or more first-type grids overlapping the first second-type grid;

generating an operation plan corresponding to an agricultural work machine based on the predictive yield value; and controlling the agricultural work machine based on the operation plan.

2. The agricultural system of claim 1, wherein the operation plan includes: (i) a route; (ii) a machine setting; (iii) an assignment; or (iv) a combination of (i), (ii), and (iii).

3. The agricultural system of claim 1, wherein the one or more characteristics comprises: (i) crop type; (ii) crop health; (iii) a terrain characteristic; (iv) a weather characteristic; or (v) a combination of (i), (ii), (iii), and (iv).

4. The agricultural system of claim 1, wherein the first-type grids comprise polygonal grids and wherein the second-type grids comprise hexagonal grids.

5. The agricultural system of claim 1, wherein generating the predictive yield value comprises:

identifying an updated second-type grid yield value corresponding the first second-type grid based on the historical second-type grid yield value, the current second-type grid yield value, and the second-type grid yield value; and identifying a value of each of the one or more characteristics corresponding to the first second-type grid based on the worksite data; and providing the updated second-type grid yield value corresponding to the first second-type grid and the value of each of the one or more characteristics corresponding to the first second-type grid as training data to a model generator to generate a predictive yield model.

6. The agricultural system of claim 5; wherein generating the predictive yield value comprises:

identifying a value of each of the one or more characteristics corresponding to a second second-type grid based on the worksite data; and providing, as a model input, the value of each of the one or more characteristics corresponding to the second second-type grid to the predictive yield model to generate, as a model output, the predictive yield value corresponding to the second second-type grid.

7. The agricultural system of claim 1, wherein the instructions, when executed by the one or more processors, further cause the one or more processors to perform a step comprising:

identify a remaining yield value, indicative of a remaining amount of bushels yet to be harvested, based on the predictive yield value, wherein generating the operation plan comprises generating the operation plan based on the remaining yield value.

8. A computer implemented method comprising:

obtaining historical yield data corresponding to one or more previous harvesting operations at a worksite;

obtaining current yield data detected during a current harvesting operation at the worksite;

obtaining worksite data indicative of one or more characteristics corresponding to the worksite;

generating a predictive yield value corresponding to the worksite based on historical yield data, the current yield data, and the worksite data, wherein generating the predictive yield value comprises:

generating a plurality of first-type grids, each corresponding to a respective location of the worksite, having a corresponding yield value, derived from current yield data; and generating a plurality of second-type grids, each corresponding to a respective location of the worksite, identifying a historical second-type grid yield value corresponding to a first second-type grid of the plurality of second-type grids based on the historical yield data;

identifying a current second-type grid yield value corresponding to the first second-type grid based on the corresponding yield value of a first-type grid, of the plurality of first-type grids, at least a portion of the first-type grid overlapping the first second-type grid; and identifying a second-type grid yield value corresponding to the first second-type grid based on the corresponding yield value of each of two or more first-type grids of the plurality of first-type grids, at least a portion of each first-type grid of the two or more first-type grids overlapping the first second-type grid;

generating an operation plan corresponding to an agricultural work machine based on the predictive yield value; and controlling the agricultural work machine based on the operation plan.

9. The computer implemented method of claim 8, wherein the operation plan includes: (i) a route; (ii) a machine setting; (iii) an assignment; or (iv) a combination of (i), (ii), and (iii).

10. The computer implemented method of claim 8, wherein the one or more characteristics comprises: (i) crop type; (ii) crop health; (iii) a terrain characteristic; (iv) a weather characteristic; or (v) a combination of (i), (ii), (iii), and (iv).

11. The computer implemented method of claim 8, wherein generating the predictive yield value comprises:

identifying an updated second-type grid yield value corresponding the first second-type grid based on the historical second-type grid yield value, the current second-type grid yield value, and the second-type grid yield value;

identifying a value of each of the one or more characteristics corresponding to the first second-type grid based on the worksite data; and providing the updated second-type grid yield value corresponding to the first second-type grid and the value of each of the one or more characteristics corresponding to the first second-type grid as training data to a model generator to generate a predictive yield model.

12. The computer implemented method of claim 11, wherein generating the predictive yield value comprises:

identifying a value of each of the one or more characteristics corresponding to a second second-type grid based on the worksite data; and providing, as a model input, the value of each of the one or more characteristics corresponding to the second second-type grid to the predictive yield model to generate, as a model output, the predictive yield value corresponding to the second second-type grid.

13. The computer implemented method of claim 8, wherein generating the predictive yield value comprises:

providing, as a model input, a value of each of the one or more characteristics corresponding to the worksite to a predictive yield model to generate, as a model output, the predictive yield value.

14. The computer implemented method of claim 8 and further comprising:

identifying a remaining yield value, indicative of a remaining amount of bushels yet to be harvested, based on the predictive yield value; and generating the operation plan based on the remaining yield value.

15. The computer implemented method of claim 8, controlling the agricultural work machine comprises controlling one or more controllable subsystems of the agricultural work machine, wherein the one or more controllable subsystems comprise: (i) a propulsion subsystem; (ii) a steering subsystem; (iii) an actuator; or (iv) a combination of (i), (ii), and (iii).

16. An agricultural system comprising:

one or more processors; and memory storing instructions executable by the one or more processors that, when executed by the one or more processors, cause the agricultural system to:

generate a plurality of first-type grids, each first type grid corresponding to a respective location of a worksite;

generate a first second-type grid corresponding to a respective location of the worksite, identify a historical second-type grid yield value corresponding to the first second-type grid based on historical yield data;

identify a current second-type grid yield value corresponding to the first second-type grid based on a corresponding yield value of a first first-type grid, of the plurality of first-type grids, at least a portion of the first first-type grid overlapping the first second-type grid;

identify a second-type grid yield value corresponding to the first second-type grid based on a yield value of each of two or more first-type grids of the plurality of first-type grids, at least a portion of each first-type grid of the two or more first-type grids overlapping the first second-type grid, the two or more first-type grids including at least one first-type grid different than the first first-type grid;

identify an updated second-type grid yield value corresponding the first second-type grid based on the historical second-type grid yield value, the current second-type grid yield value, and the second-type grid yield value; and generate a predictive yield value corresponding the worksite based, at least, on the updated second-type grid yield value corresponding to the first second-type grid;

generate an operation plan corresponding to an agricultural work machine based on the predictive yield value; and control the agricultural work machine based on the operation plan.

* * * * *